(12) United States Patent
Choi et al.

(10) Patent No.: US 12,443,035 B2
(45) Date of Patent: Oct. 14, 2025

(54) AUGMENTED REALITY CONTENT PROVIDING APPARATUS AND AUGMENTED REALITY CONTENT PROVIDING METHOD USING THE SAME

(71) Applicant: Samsung Display Co., LTD., Yongin-si (KR)

(72) Inventors: Hae Yun Choi, Hwaseong-si (KR); Min Woo Kim, Hwaseong-si (KR); Byung Choon Yang, Seoul (KR); Tae Hee Lee, Hwaseong-si (KR); Joo Woan Cho, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 440 days.

(21) Appl. No.: 17/942,871

(22) Filed: Sep. 12, 2022

(65) Prior Publication Data
US 2023/0077804 A1  Mar. 16, 2023

(30) Foreign Application Priority Data
Sep. 15, 2021  (KR) .......... 10-2021-0122980

(51) Int. Cl.
| | |
|---|---|
| *G02B 27/01* | (2006.01) |
| *B60K 35/00* | (2024.01) |
| *B60K 35/23* | (2024.01) |
| *B60K 35/28* | (2024.01) |
| *B60K 35/60* | (2024.01) |

(52) U.S. Cl.
CPC .......... *G02B 27/0101* (2013.01); *B60K 35/00* (2013.01); *B60K 35/23* (2024.01); *B60K 35/28* (2024.01); *B60K 35/60* (2024.01); *B60K 2360/177* (2024.01); *B60K 2360/779* (2024.01); *G02B 2027/0141* (2013.01)

(58) Field of Classification Search
CPC ..... G02B 27/00–648; G02B 2027/0105–0198; B60K 35/00–90; B60K 2360/00–96
See application file for complete search history.

(56) References Cited

U.S. PATENT DOCUMENTS

| | | | |
|---|---|---|---|
| 2016/0176372 A1* | 6/2016 | Kim ....................... | B60K 35/10 |
| | | | 701/49 |
| 2019/0179331 A1* | 6/2019 | Heo ................... | G01C 21/3682 |

FOREIGN PATENT DOCUMENTS

| | | |
|---|---|---|
| JP | 2005-136561 A | 5/2005 |
| KR | 10-2014-0006368 A | 1/2014 |
| KR | 10-2018-0118488 A | 10/2018 |

* cited by examiner

*Primary Examiner* — Christopher A Lamb, II
(74) *Attorney, Agent, or Firm* — Womble Bond Dickinson (US) LLP

(57) ABSTRACT

According to some embodiments of the disclosure, an AR-content-providing apparatus includes display modules configured to display AR content images on windows of a vehicle, at least one sensing module configured to generate image data obtained by capturing surroundings of the vehicle, and configured to generate distance sensing signals corresponding to distances to objects and people outside the vehicle, and a control module configured to generate AR content corresponding to driving information and surrounding information of the vehicle using the image data and the distance sensing signals, and configured to control the display modules and at least one electronic device to display the AR content.

20 Claims, 18 Drawing Sheets

AUGMENTED REALITY CONTENT PROVIDING APPARATUS AND AUGMENTED REALITY CONTENT PROVIDING METHOD USING THE SAME

CROSS-REFERENCE TO RELATED APPLICATION

This application claims priority to, and the benefit of, Korean Patent Application No. 10-2021-0122980, filed on Sep. 15, 2021, the disclosure of which is incorporated herein by reference in its entirety.

BACKGROUND

1. Field

The present disclosure relates to a device for providing augmented reality (AR) content, and a method of providing AR content using the same.

2. Description of the Related Art

Recently, electronic devices and display devices capable of realizing virtual reality (VR) have been developed, and interest in them is increasing. As the next stage of VR, a technology capable of realizing augmented reality (AR) and mixed reality (MR) is also being studied.

AR is a display technology that further increases the effect of reality by superimposing virtual objects or image information on a real-world environment, unlike VR that assumes a completely virtual world.

While VR has been limitedly applied only to fields such as games and virtual experiences, AR has an advantage in that it may be applied to various real-world environments. In particular, AR is attracting attention as a next-generation display technology suitable for a ubiquitous environment or an Internet of things (IoT) environment. AR can be said to be an example of MR, in that it shows additional information of a virtual world mixed with the real world.

SUMMARY

Aspects of the present disclosure provide an augmented reality (AR)-content-providing apparatus capable of implementing AR content through a car window and an electronic device of a vehicle, and an AR content providing method using the same.

Aspects of the present disclosure also provide an AR-content-providing apparatus capable of implementing an AR content image on a car window using a micro-LED display device, and an AR content providing method using the same.

It should be noted that objects of the present disclosure are not limited to the above-described objects, and other objects of the present disclosure will be apparent to those skilled in the art from the following descriptions.

According to some embodiments of the present disclosure, an AR-content-providing apparatus includes display modules configured to display AR content images on windows of a vehicle, at least one sensing module configured to generate image data obtained by capturing surroundings of the vehicle, and configured to generate distance sensing signals corresponding to distances to objects and people outside the vehicle, and a control module configured to generate AR content corresponding to driving information and surrounding information of the vehicle using the image data and the distance sensing signals, and configured to control the display modules and at least one electronic device to display the AR content.

The control module may be further configured to receive control information of the vehicle through an instrument control system of the vehicle, generate at least one of guidance information, directionality information of the objects near the vehicle, location information, and caution information according to the driving information, the control information, and/or the surrounding information of the vehicle, and generate AR content data for the display modules by classifying at least one of the driving information, the control information, the surrounding information, the guidance information, the directionality information, the location information, and the caution information according to an AR content image display of the display modules.

The display modules may include a first display module configured to provide the AR content image to a first image display area in a window in front of a driver seat, a second display module configured to provide the AR content image to a second image display area in a window to a side of the driver seat, a third display module configured to provide the AR content image to a third image display area in a window on a rear side of the vehicle, a fourth display module configured to provide the AR content image to a fourth image display area of a window to a side of a passenger seat, a fifth display module configured to provide the AR content image to a fifth image display area in a sunroof or a reflective member in a ceiling of the vehicle, and a sixth display module configured to provide the AR content image to a sixth image display area of a center fascia, a dashboard, or a console box inside the vehicle.

The control module may include a signal processing unit configured to receive control information of the vehicle through an instrument system of the vehicle, and configured to generate directionality information, location information, and/or distance information of objects and/or people outside the vehicle, a content generation control unit configured to classify at least one of the control information, the driving information, the directionality information, the location information, and the distance information of the objects and/or the people according to an image display location for the first to sixth display modules, and configured to generate AR content data for the first to sixth display modules, and a display control unit configured to modulate the AR content data classified for the first to sixth display modules according to an image display position of the first to sixth display modules, and configured to control the first to sixth display modules.

The control module may further include an electronic device control unit configured to operate at least one acoustic device, vibration device, or fragrance device of the at least one electronic device according to characteristics of the AR content data.

The content generation control unit may be configured to receive biosignal information including at least one of heart rate information, blood pressure information, and body temperature information from one or more external content display devices, is configured to generate AR content data including the biosignal information, and is configured to transmit, to the display control unit, the AR content data including the biosignal information to be displayed on at least one of the first to sixth display modules.

The external content display devices may include at least one of a flat-panel content display device, a glasses-type virtual reality device, and a watch-type smart device to display the AR content data shared with the control module through an AR content image, vibration, or sound effect.

The content generation control unit may be configured to control the display control unit such that a first AR content image including at least one of the control information, the driving information, the directionality information, the location information, and the distance information is displayed by the first display module, a second AR content image including the control information, the driving information, the directionality information, the location information, and/or guidance information or caution information corresponding to the distance information is displayed by the second display module, a third AR content image including the guidance information or the caution information is displayed by the third display module, a fourth AR content image including the directionality information, the distance information, and/or the guidance information is displayed by the fourth display module, a fifth AR content image including the driving information, guidance information, and/or the caution information is displayed by the fifth display module, and a sixth AR content image including the driving information, the guidance information, and/or the caution information is displayed by the sixth display module.

The first to sixth display modules, the at least one sensing module, and the control module may be integrally formed or assembled with at least one of a room mirror, a center fascia, a dashboard, a console box, a dome light, a sun visor, a sunroof control box, and a headrest.

The display modules may include at least one image display device configured to display the AR content image, and at least one diffusion lens, at least one focusing lens, and at least one optical member selected from a refractive lens for changing a display path of the AR content image and an optical wavelength.

The at least one image display device may include a partition wall on a substrate, light-emitting devices arranged in light-emitting areas arranged in an RGBG matrix structure by partition of the partition wall, and extending in a thickness direction of the substrate, a base resin in the light-emitting areas, and an optical pattern in at least one of the light-emitting areas.

The light-emitting areas may have first to third light-emitting areas or first to fourth light-emitting areas in a pixel area in the RGBG matrix structure.

The first light-emitting area may include a first light-emitting device configured to emit first light in a wavelength band corresponding to any one of red, green, and blue, a second light-emitting device configured to emit second light in a wavelength band corresponding to another one of red, green, and blue, which is different from that of the first light, a third light-emitting device configured to emit third light in a wavelength band corresponding to yet another one of red, green, and blue, which is different from those of the first light and the second light, and a fourth light-emitting device configured to emit fourth light in a same wavelength band as one of the first to third light.

The first to fourth light-emitting areas may have a same size or planar area, wherein a distance between the first light-emitting area and the second light-emitting area, which are adjacent to each other in a transverse direction or a diagonal direction, a distance between the second light-emitting area and the third light-emitting area, which are adjacent to each other in the transverse direction or diagonal direction, a distance between the first light-emitting area and the third light-emitting area, which are adjacent to each other in the transverse direction or diagonal direction, and a distance between the third light-emitting area and the fourth light-emitting area, which are adjacent to each other in the transverse direction or diagonal direction, are the same.

Two or more of the first to fourth light-emitting areas may have different respective sizes or planar areas, wherein two or more of a distance between the first light-emitting area and the second light-emitting area, a distance between the second light-emitting area and the third light-emitting area, a distance between the first light-emitting area and the third light-emitting area, and a distance between the third light-emitting area and the fourth light-emitting area are different.

According to some embodiments of the present disclosure, an AR content providing method includes generating image data obtained by capturing surroundings of a vehicle and distance sensing signals corresponding to distances to objects and/or people outside the vehicle, generating AR content including driving information and surrounding information of the vehicle using the image data and the distance sensing signals, controlling display modules and at least one electronic device to display the AR content, and displaying AR content images on windows of the vehicle through the display modules.

The generating AR content may include receiving control information of the vehicle through an instrument system of the vehicle, detecting surrounding information including driving information of the vehicle, and distance information of the objects through the image data and the distance sensing signals, and generating AR content data for the display modules by classifying the driving information, the control information, and the surrounding information according to an AR content image display position for the display modules.

The generating AR content data for the display modules may include generating at least one of guidance information, directionality information of the objects, location information, and caution information according to the driving information, the control information, and/or the surrounding information, classifying at least one of the driving information, the control information, the surrounding information, the guidance information, the directionality information, the location information, and the caution information according to an image display position for first to sixth display modules included in the display modules, and modulating the AR content data classified for the first to sixth display modules according to display characteristics for the first to sixth display modules.

The controlling display modules and at least one electronic device may include operating at least one acoustic device, vibration device, and/or fragrance device in response to characteristics of the AR content data classified for the first to sixth display modules.

The generating AR content data for the display modules may further include generating a detection signal for a driver's eye or pupil through at least one sensing module, generating the AR content data including driver condition information corresponding to the detection signal, setting the AR content data including the driver condition information to be displayed on at least one of the first to sixth display modules, and providing the AR content data to a display control unit for controlling the first to sixth display modules.

With the AR-content-providing apparatus, and the AR content providing method using the same, according to some embodiments of the present disclosure, it is possible to increase the utility of the AR-content-providing apparatus by implementing AR content through a car window and an electronic device of a vehicle.

Also, with the AR-content-providing apparatus, and the AR content providing method using the same, according to some embodiments of the present disclosure, it is possible to increase the display quality of AR content images by implementing the AR content images on a car window using a micro LED.

Aspects according to the disclosed embodiments are not limited by the contents described above, and further various aspects are included in the present disclosure.

BRIEF DESCRIPTION OF THE DRAWINGS

The above and other aspects of the present disclosure will become more apparent by describing embodiments thereof in detail with reference to the attached drawings, in which.

DETAILED DESCRIPTION

Figure 1:
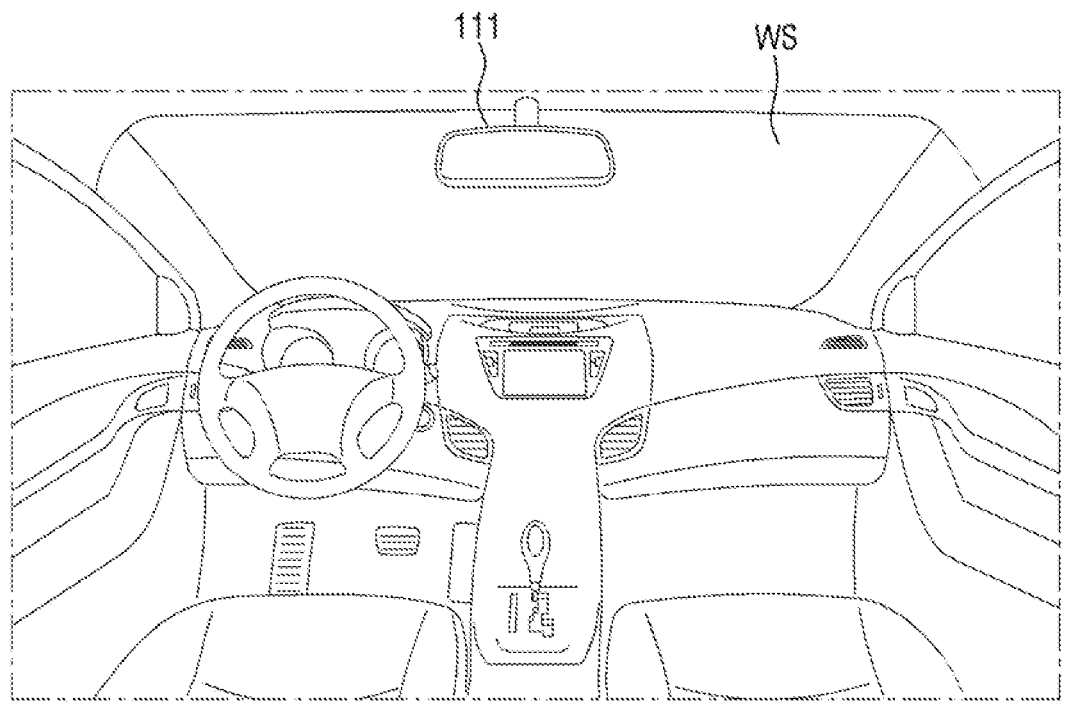
FIG. 1 is a diagram showing an application example of an augmented reality (AR)-content-providing apparatus according to some embodiments of the present disclosure.

Aspects of some embodiments of the present disclosure and methods of accomplishing the same may be understood more readily by reference to the detailed description of embodiments and the accompanying drawings. Hereinafter, embodiments will be described in more detail with reference to the accompanying drawings. The described embodiments, however, may have various modifications and may be embodied in various different forms, and should not be construed as being limited to only the illustrated embodiments herein. Rather, these embodiments are provided as examples so that this disclosure will be thorough and complete, and will fully convey the aspects of the present disclosure to those skilled in the art, and it should be understood that the present disclosure covers all the modifications, equivalents, and replacements within the idea and technical scope of the present disclosure. Accordingly, processes, elements, and techniques that are not necessary to those having ordinary skill in the art for a complete understanding of the aspects of the present disclosure may not be described.

Unless otherwise noted, like reference numerals, characters, or combinations thereof denote like elements throughout the attached drawings and the written description, and thus, descriptions thereof will not be repeated. Further, parts that are not related to, or that are irrelevant to, the description of the embodiments might not be shown to make the description clear.

In the drawings, the relative sizes of elements, layers, and regions may be exaggerated for clarity. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place.

Thus, the regions illustrated in the drawings are schematic in nature and their shapes are not intended to illustrate the actual shape of a region of a device and are not intended to be limiting. Additionally, as those skilled in the art would realize, the described embodiments may be modified in various different ways, all without departing from the spirit or scope of the present disclosure.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

Further, in this specification, the phrase "on a plane," or "plan view," means viewing a target portion from the top, and the phrase "on a cross-section" means viewing a cross-section formed by vertically cutting a target portion from the side.

It will be understood that when an element, layer, region, or component is referred to as being "formed on," "on," "connected to," or "coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or intervening layers, regions, or components may be present. However, "directly connected/directly coupled," or "directly on," refers to one component directly connecting or coupling another component, or being on another component, without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

For the purposes of this disclosure, expressions such as "at least one of," when preceding a list of elements, modify the entire list of elements and do not modify the individual elements of the list. For example, "at least one of X, Y, and Z," "at least one of X, Y, or Z," and "at least one selected from the group consisting of X, Y, and Z" may be construed as X only, Y only, Z only, any combination of two or more of X, Y, and Z, such as, for instance, XYZ, XYY, YZ, and ZZ, or any variation thereof. Similarly, the expression such as "at least one of A and B" may include A, B, or A and B. As used herein, "or" generally means "and/or," and the term "and/or" includes any and all combinations of one or more of the associated listed items. For example, the expression such as "A and/or B" may include A, B, or A and B.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure. The description of an element as a "first" element may not require or imply the presence of a second element or other elements. The terms "first", "second", etc. may also be used herein to differentiate different categories or sets of elements. For conciseness, the terms "first", "second", etc. may represent "first-category (or first-set)", "second-category (or second-set)", etc., respectively.

In the examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third directions.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

When one or more embodiments may be implemented differently, a specific process order may be performed differently from the described order. For example, two consecutively described processes may be performed substantially at the same time or performed in an order opposite to the described order.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within +30%, 20%, 10%, 5% of the stated value. Further, the use of "may" when describing embodiments of the present disclosure refers to "one or more embodiments of the present disclosure."

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112 (a) and 35 U.S.C. § 132 (a).

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a diagram showing an application example of an augmented reality (AR)-content-providing apparatus according to some embodiments of the present disclosure.

Referring to FIG. 1, an AR-content-providing apparatus 111 is integrally formed with a vehicle's rearview mirror, and is configured to display an AR content image on a car window (e.g., including a windshield or windscreen) WS of the vehicle and/or on a reflective material inside the vehicle. The AR-content-providing apparatus 111 enables the visual AR content images to be provided to a driver and passengers through the car windows WS of the vehicle, and may enable auditory, olfactory, and tactile AR content to be provided through electronic devices. The AR content generated and displayed by the AR-content-providing apparatus 111 may be displayed on at least one other content display device, such as a tablet personal computer (PC).

The AR-content-providing apparatus 111 is integrally formed or assembled with interior materials or indoor devices, such as a center fascia, dashboard, console box, dome light, sun visor, sunroof control box, seat, headrest, etc. in addition to the vehicle's rearview mirror. An example in which the AR-content-providing apparatus 111 is integrally formed with the vehicle's rearview mirror will be described below.

The AR-content-providing apparatus 111 allows an AR content image to be superimposed on a real image shown to the driver or passengers through each of the car windows WS located on the front, sides, and/or rear of the vehicle. To this end, the AR-content-providing apparatus 111 displays an AR content image through the car windows WS to which a reflective material is added, or displays an AR content image through a transparent lens (or a refractive lens) of the car windows WS. The AR content image may be a two-dimensional (2D) or a three-dimensional (3D) image obtained by combining at least one of a graphic image, hologram, a shot image, a video, and text The AR-content-providing apparatus 111 may further include at least one display module for displaying an AR content image, and optical members. As an example, the AR-content-providing apparatus 111 may include optical members for changing the size, display paths (or optical paths), focuses, and the like of an AR content image displayed on the at least one display module such that the AR content image may be perceived by the eyes of the driver and passengers.

The AR-content-providing apparatus 111 senses a vehicle driving environment, an external environment, and a change in the driver's body in real time, and generates an AR content for stimulating senses such as tactile, olfactory, and auditory senses in addition to visual image content according to results of the sensing. For example, the AR-content-providing apparatus 111 displays an AR content image on the car window WS, etc. so that the AR content image is superimposed on a real image outside the car windows WS visible to the driver or passengers. In addition, the AR-content-providing apparatus 111 control operations of electronic devices configured to stimulate senses such as tactile, olfactory, and auditory senses. Also, the AR-content-providing apparatus 111 may transmit AR content including an AR content image to at least one other content display device such as a smartphone to support the displaying of the same content on different content display devices.

At least one content display device, other than the AR-content-providing apparatus 111, may be a content display device owned by a driver, a passenger, or the like. The content display devices may display on a screen AR content that is transmitted and received in real time from the AR-content-providing apparatus 111, for example, an AR content image. When AR content data is received from the AR-content-providing apparatus 111, the at least one content display device may output the AR content data to a screen and a speaker at the same timing.

At least one content display apparatus including the AR-content-providing apparatus 111 may be applied to a wrist watch-type electronic device, a head-mounted display, an external billboard, an electronic display board, a medical device, an inspection device, various home appliances such as refrigerators and washing machines, or Internet of Things (IoT) devices. Also, at least one content display device may be a tablet mobile communication device, such as a smartphone or a tablet PC, a personal digital assistant (PDA), a portable multimedia player (PMP), a television, a game console, a monitor of a personal computer, a notebook computer, a flat-panel image display device, a vehicle navigation system, a vehicle dashboard, a digital camera, a camcorder, etc. Here, as an example of the content display devices, a flat-panel image display device mounted on a center fascia, headrest, console box, etc. of a vehicle is described, and the flat-panel image display device may have high resolution or ultra-high resolution such as HD, UHD, 4K, and 8K.

A flat-panel image display device that is used as an image display module or a content display device of the AR-content-providing apparatus 111 may be classified as an organic light-emitting diode (OLED), an inorganic electroluminescent (inorganic EL), a quantum dot light-emitting diode (QLED), a micro LED, a nano-LED, a plasma display panel (PDP), a field-emission display (FED), a cathode-ray tube (CRT), a liquid crystal display (LCD), an electrophoretic display (EPD), or the like. Hereinafter, a micro LED will be described as a content display device or a display module, and unless a special distinction is suitable, the micro LED applied to some embodiments will be simply abbreviated as a display device. However, the embodiment is not limited to the micro LED, and other content display devices listed above or known in the art may be applied within the scope of sharing technical ideas.

Figure 2:
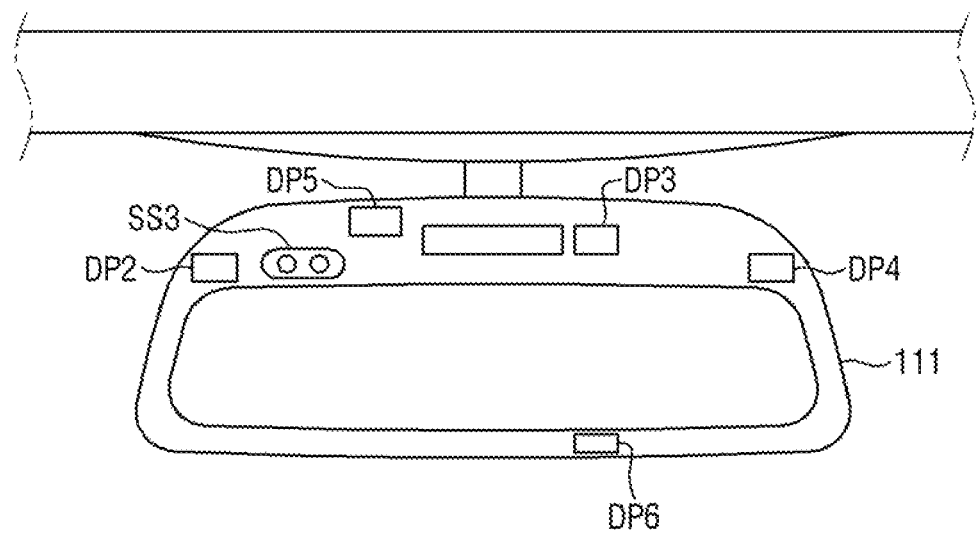
FIG. 2 is a front view showing an AR-content-providing apparatus integrally formed with a rearview mirror of FIG. 1.
Figure 3:
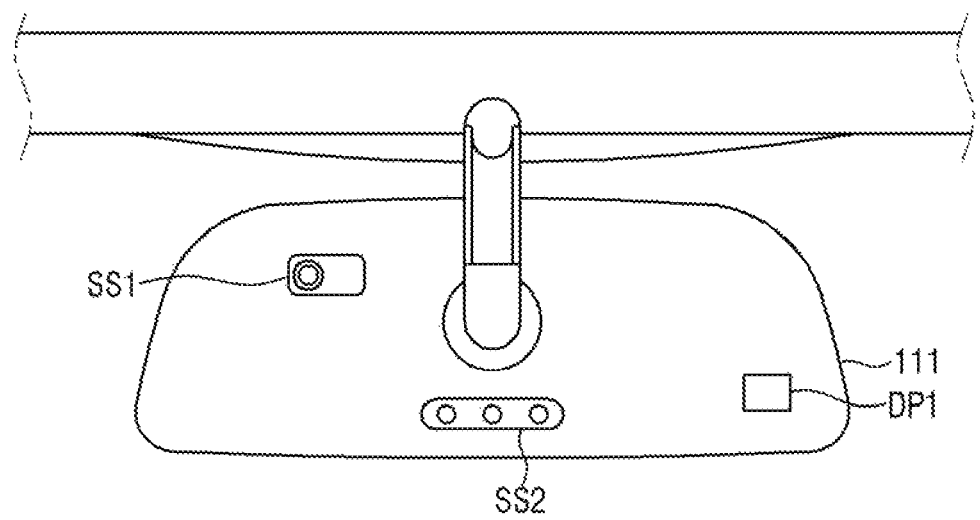
FIG. 3 is a rear view showing an AR-content-providing apparatus integrally formed with a rearview mirror of FIG. 2.

FIG. 2 is a front view showing an AR-content-providing apparatus integrally formed with a rearview mirror of FIG. 1. FIG. 3 is a rear view showing an AR-content-providing apparatus integrally formed with a rearview mirror of FIG. 2.

Referring to FIGS. 2 and 3, the AR-content-providing apparatus 111 integrally formed with the rearview mirror includes first to sixth display modules DP1 to DP6 formed on surfaces in a forward direction, a rearward direction, leftward and rightward directions, and a lower direction of the rearview mirror.

The first display module DP1 may be formed on a surface in the rearward direction or in the lower direction of the rearview mirror. The first display module DP1 provides an AR content image to a forward car window of a driver seat, so that the AR content image is displayed through the forward car window and a transparent lens. The forward car window may include a transparent lens, a translucent optical waveguide (e.g., a prism) or the like. Accordingly, the AR content image displayed through the first display module DP1 may be perceived by a driver's eyes through the optical waveguide, transparent lens, reflective member, or the like of the forward car window.

The second display module DP2 may be formed on a surface in the forward direction or in one side direction of the rearview mirror. The second display module DP2 provides an AR content image to a side car window of a driver seat, so that the AR content image is displayed through the side car window, etc. The side car window of the driver seat may include a transparent lens, a translucent optical waveguide (e.g., a prism) or the like. Accordingly, the AR content image displayed through the second display module DP2 may be perceived by a driver's eyes through the optical waveguide, transparent lens, reflective member, or the like of the side car window.

The third display module DP3 may be formed on a surface in the forward direction of the rearview mirror. The third display module DP3 provides an AR content image to a rearward car window of a driver seat, so that the AR content image is displayed through the rearward car window, etc. The rearward car window of the vehicle may include a transparent lens, a reflective member, or a translucent optical waveguide. Accordingly, the AR content image displayed through the third display module DP3 may be perceived by a driver's eyes or a passenger's eyes through the optical waveguide, transparent lens, reflective member, or the like of the rearward car window.

The fourth display module DP4 may be formed on a surface in the forward direction or in the other side direction of the rearview mirror. The fourth display module DP4 provides an AR content image to the other-side car window of a driver seat (e.g., a side car window of a passenger seat), so that the AR content image is displayed through the other-side car window, etc. The other-side car window may also include a transparent lens, a translucent optical waveguide (e.g., a prism) or the like. Accordingly, the AR content image displayed through the fourth display module DP4 may be perceived by a passenger's eyes through the optical waveguide, the transparent lens, the reflective member, or the like of the other-side car window.

The fifth display module DP5 may be formed on a surface in the forward direction or in an upper direction of the rearview mirror. The fifth display module DP5 provides an AR content image toward a sunroof in the roof of the vehicle, so that the AR content image is displayed through the sunroof or a reflective member in the ceiling. The sunroof may include a transparent lens, a translucent optical waveguide, or the like. Accordingly, the AR content image displayed through the fifth display module DP5 may be perceived by a passenger's eyes through the reflective member in the ceiling or the optical waveguide or transparent lens of the sunroof.

The sixth display module DP6 may be formed on a surface in the lower direction of the rearview mirror. The sixth display module DP6 provides an AR content image toward a center fascia, a dashboard, or a console box, so that the AR content image is displayed through a reflective member of the center fascia, the dashboard, the console box, or the like. Accordingly, the AR content image provided from the sixth display module DP6 may be perceived by a driver's eyes or a passenger's eyes through the reflective member of the center fascia, the dashboard, the console box, or the like.

Figure 4:
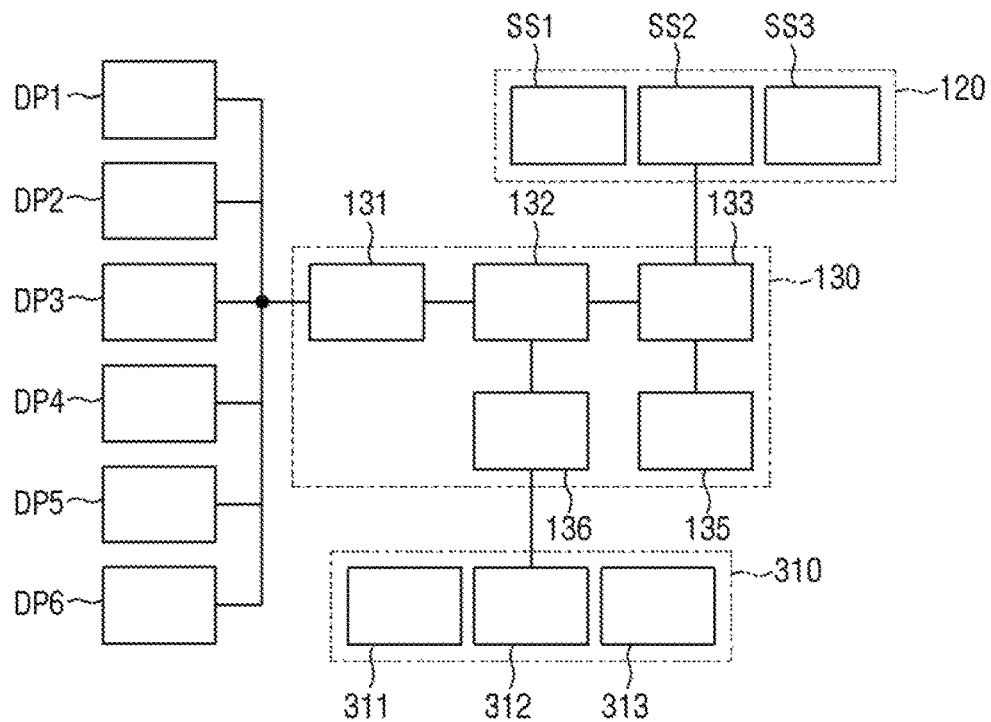
FIG. 4 is a block diagram schematically illustrating elements of the AR-content-providing apparatus shown in FIGS. 1 to 3.

FIG. 4 is a block diagram schematically illustrating elements of the AR-content-providing apparatus shown in FIGS. 1 to 3.

Referring to FIGS. 2 to 4, the AR-content-providing apparatus 111 may include at least one sensing module 120, a control module 130 for controlling first to sixth display modules DP1 to DP6, and at least one electronic device 310.

The at least one sensing module 120 may be formed integrally with the rearview mirror or attached to the surface of the rearview mirror. Also, the at least one sensing module 120 may be additionally formed on an automotive interior material, an interior decoration, or an electronic device other than the rearview mirror. The sensing module 120 senses a distance (or depth) to an object in front, distances to objects on both sides, distances to objects in diagonal directions, distances to nearby vehicles, distances to nearby people or animals, external illuminance, and the moving direction, moving distance, and tilt of a vehicle. To this end, the at least one sensing module 120 may include at least one of an image sensor SS1, a depth sensor SS2, an illuminance sensor, a human body detection sensor, a gyro sensor, a tilt sensor, and an acceleration sensor. Also, the at least one sensing module 120 may further include at least one biosensor SS3 for sensing movement information of a driver's eye or pupil.

Image sensors SS1, such as a camera, may be located in the forward direction, the rearward direction, the leftward direction, the rightward direction, and/or diagonal directions of the rearview mirror. As an example, the image sensors SS1 may be located in a forward direction and a rear direction of the vehicle, and in directions of side-view mirrors. The image sensors SS1 detect images in one of the forward, rearward, leftward, rightward, and diagonal directions of the vehicle in real time. Image data generated through the image sensors SS1 is transmitted to the control module 130 in real time, and is used by the control module 130 to recognize and analyze nearby objects.

Depth sensors SS2, such as an infrared sensor or a LiDAR (light detection and ranging) sensor, may be located in the forward direction, the rearward direction, the leftward and rightward directions, and diagonal directions of the rearview mirror. As an example, the depth sensors SS2 may be located in the forward direction and the rearward direction of the vehicle, in the directions of side-view mirrors, and the like.

The depth sensors SS2 detect distance sensing signals for distances to objects, vehicles, people, animals, etc. positioned in at least one of the forward direction, rearward direction, leftward and rightward directions, and/or diagonal directions of the vehicle. The distance sensing signals of the depth sensors SS2 are transmitted to the control module 130 in real time, and are used by the control module 130 to recognize nearby objects and detect distance information.

The at least one biosensor SS3 may be located on the front or side of the rearview mirror in a direction facing the driver's eyes, or may be located on a sun visor, a ceiling, a lighting box on a ceiling, etc. The at least one biosensor SS3 includes at least one infrared light source and at least one infrared camera. The at least one infrared light source outputs infrared rays, and the at least one infrared camera detects infrared rays reflected from an eye or pupil, which is a subject. Here, the at least one infrared light source may be configured as an infrared LED array having a matrix structure. Also, the infrared camera includes a filter that passes infrared rays and blocks wavelength bands other than infrared rays, a lens system that focuses infrared rays passing through the filter, an optical image sensor that converts an optical image formed by the lens system into an electrical image signal and outputs the electrical image signal, etc. The optical image sensor may be configured in an array of a matrix structure like the infrared LED array. The at least one biosensor SS3 configured as described above transmits, to the control module 130, pupil detection signals generated by detecting infrared rays reflected from the pupil in real time.

The at least one electronic device 310, which is a device for stimulating senses such as auditory, olfactory, and/or tactile senses, includes at least one acoustic device 311, at least one vibration device 312, and/or at least one fragrance device 313, etc.

The control module 130 receives the distance sensing images and image data in one of the forward direction, rearward direction, leftward and rightward directions, and/or diagonal directions of the vehicle in real time. Also, the control module 130 detects surrounding information including real-time driving information of the vehicle and surrounding information including distance information between the vehicle and nearby objects, etc. Also, the control module 130 receives vehicle control information. The control module 130 classifies the real-time driving information, control information, and surrounding information of the vehicle according to the display positions of the first to sixth display modules DP1 to DP6, and generates AR content data to be displayed separately for each of the first to sixth display modules DP1 to DP6. Also, the control module 130 controls the first to sixth display modules DP1 to DP6 and the at least one electronic device 310, such that AR content is displayed through the first to sixth display modules DP1 to DP6 and the at least one electronic device 310.

As shown in FIG. 4, the control module 130 includes a display control unit 131, a content generation control unit 132, a signal processing unit 133, an electronic device control unit 136, and a communication unit 135.

The signal processing unit 133 receives the image data obtained by capturing the surrounding of the vehicle, and analyzes and classifies edge values, luminance values, and/or grayscale values of the image data. Then, the signal processing unit 133 classifies and detects nearby objects and people from the image data according to a result of the analysis, and generates directionality information and location information on the nearby objects and people included in the image data of each direction. The signal processing unit 133 shares the directionality information and the location information on the nearby objects and peoples with the content generation control unit 132. Here, the image data obtained by capturing the surrounding of the vehicle may be image data obtained by performing capturing in at least one of the forward direction, rearward direction, leftward and rightward directions, and/or diagonal directions of the vehicle.

Also, the signal processing unit 133 receives, in real time, the distance sensing signals in at least one of the forward direction, rearward direction, leftward and rightward directions, and/or diagonal directions of the vehicle and generates distance information of objects near the vehicle. The distance information of the nearby objects is shared with the content generation control unit 132 in real time.

The content generation control unit 132 receives, in real time, control state information and driving information of the vehicle through an instrument system or any central processing unit (CPU) of the vehicle. Also, the content generation control unit 132 receives the directionality information and location information of the nearby objects, distance information of nearby objects, etc. from the signal processing unit 133.

The content generation control unit 132 separates, classifies, and rearranges the control state information and the real-time driving information of the vehicle, directionality information and location information on nearby objects, distance information of nearby objects, etc. according to the image display positions of the first to sixth display modules DP1 to DP6.

In detail, the content generation control unit 132 classifies and places or stores, in combination, the control state information and the real-time driving information of the vehicle, directionality information and location information of the nearby objects, distance information of the nearby objects, etc. to be displayed separately for each of the first to sixth display modules DP1 to DP6. Also, the content generation control unit 132 sorts information rearranged or combined for each of the first to sixth display modules DP1 to DP6 (e.g., in a preset display order), and generates AR content data to be displayed for each of the first to sixth display modules DP1 to DP6. Subsequently, the content generation control unit 132 separately transmits, to the display control unit 131, the AR content data to be displayed for each of the first to sixth display modules DP1 to DP6.

The electronic device control unit 136 generates and transmits operation control signals for operating at least one acoustic device 311, at least one vibration device 312, and at least one fragrance device 313, according to the characteristics of the AR content data.

The communication unit 135 includes at least one communication module among a BLUETOOTH® module, an infrared data association (IrDA) module, a Wi-Fi-Direct® communication module, and a near field communication (NFC) module (Wi-Fi® and Wi-Fi-Direct® are registered trademarks of the non-profit Wi-Fi Alliance, and BLUETOOTH® is a registered trademark of Bluetooth Sig, Inc., Kirkland, WA). Accordingly, the communication unit 135 may perform pairing and wireless communication with external content display devices using at least one of a BLUETOOTH® communication scheme, an infrared communication scheme, a Wi-Fi-Direct® communication scheme, and an NFC method.

The communication unit 135 transmits the AR content data that is generated to be displayed for each of the first to sixth display modules DP1 to DP6 to external content display devices, thereby supporting the displaying of the AR content data on the external content display devices. Also, the communication unit 135 may receive biosignal information, such as heart rate information, blood pressure information, and body temperature information, from the external content display devices, and may transmit the biosignal information to the content generation control unit 132. Subsequently, the content generation control unit 132 may generate AR content data including the biosignal information, such as heart rate information, blood pressure information, and body temperature information, and may transmit the AR content data to the display control unit 131.

The display control unit 131 sorts the image data of the AR content data input from the content generation control unit 132 separately for each of the first to sixth display modules DP1 to DP6. Also, the display control unit 131 performs control such that the AR content images are modulated according to display characteristics (or driving characteristics), such as resolution and driving frequency of the first to sixth display modules DP1 to DP6, and displayed on the first to sixth display modules DP1 to DP6.

Figure 5:
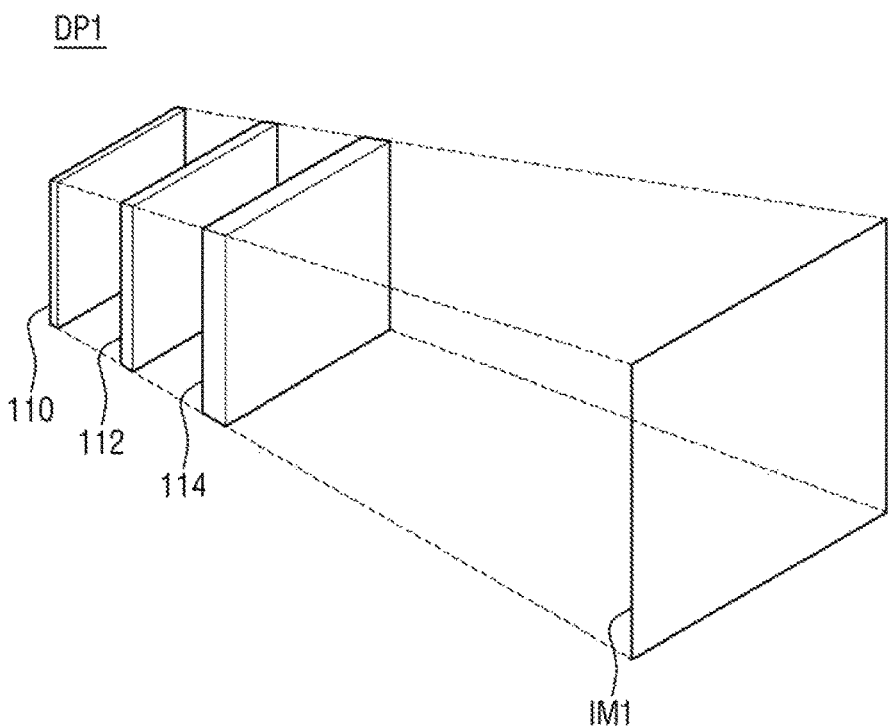
FIG. 5 is a configuration diagram schematically illustrating one display module shown in FIGS. 2 to 4.

FIG. 5 is a configuration diagram schematically illustrating one display module shown in FIGS. 2 to 4.

Referring to FIGS. 4 and 5, each of the first to sixth display modules DP1 to DP6 enables an AR content image to be displayed on a reflective member or a car window WS of a vehicle, so that the AR content image is superimposed on a real image shown to a driver or passengers through the car window WS or the reflective member. To this end, each of the first to sixth display modules DP1 to DP6 may include at least one image display device 110, at least one diffusion lens 112, and at least one focusing lens 114. Also, each of the first to sixth display modules DP1 to DP6 may further include optical members, such as an optical waveguide and a refractive lens, that may change a display path (or an optical path) of the AR content image (e.g., image IM1). The AR content image displayed through each image display device 110 may be provided and displayed to a car window (WS), a reflective member, or the like through the at least one diffusion lens 112, the at least one focusing lens 114, the optical member, or the like.

The image display device 110 included in each of the first to sixth display modules DP1 to DP6 is a micro LED, a nano LED, an organic light-emitting diode (OLED), an inorganic electroluminescent (inorganic EL), a quantum dot light-emitting diode (QED), a cathode ray display device (CRT), a liquid crystal display device (LCD), and the like. An example in which the image display device 110 includes a micro LED device will be described below. However, the embodiment is not limited to the micro LED device, and other display devices listed above or known in the art may be applied within the scope of sharing technical ideas.

Figure 6:
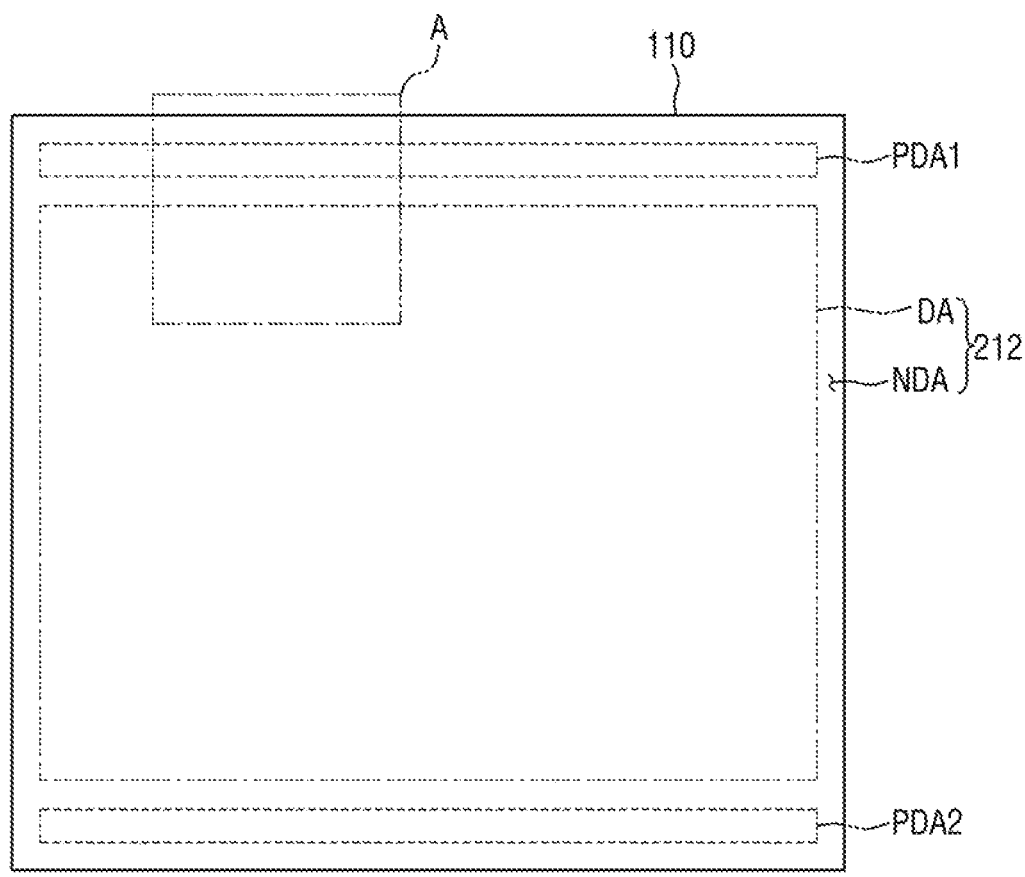
FIG. 6 is a layout diagram illustrating an image display device shown in FIG. 5.
Figure 6:
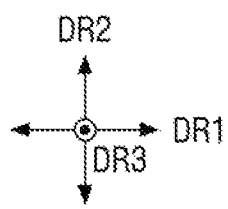
Figure 7:
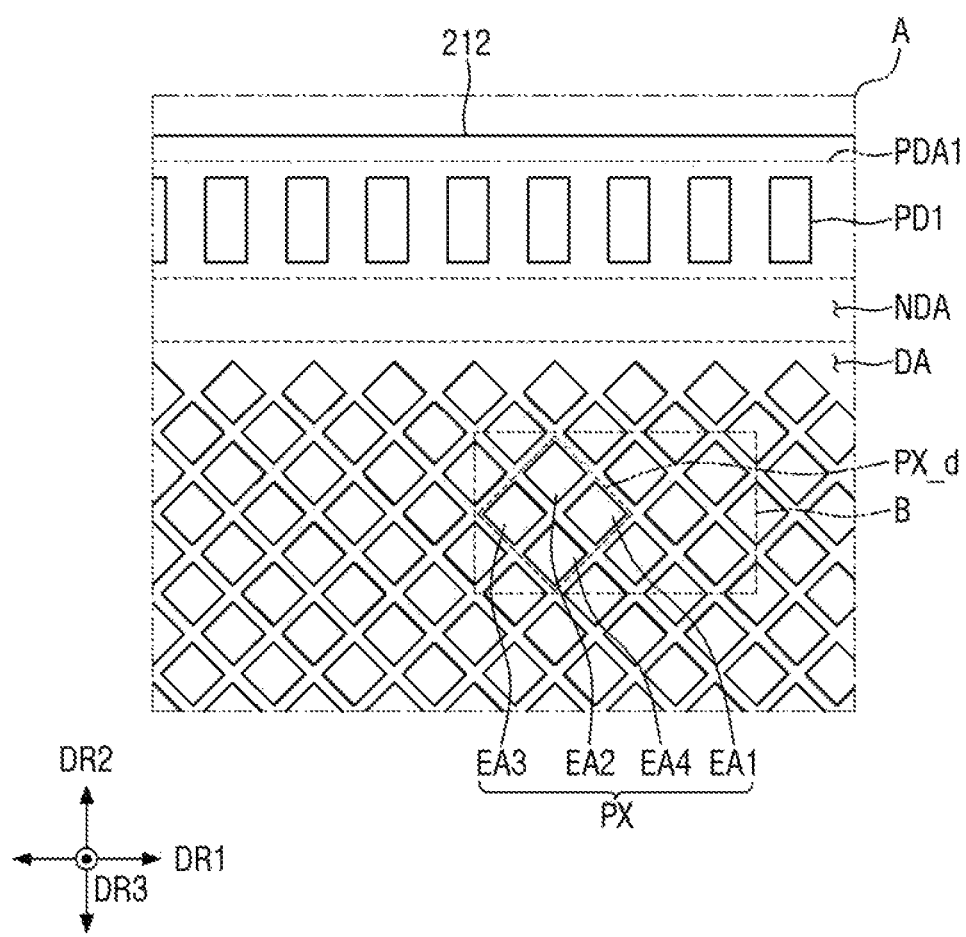
FIG. 7 is a layout diagram illustrating an area A of FIG. 6 in detail.

FIG. 6 is a layout diagram illustrating an image display device shown in FIG. 5. FIG. 7 is a layout diagram illustrating an area A of FIG. 6 in detail, and FIG. 8 is a layout diagram illustrating pixels shown in an area B of FIG. 7 in detail.

Figure 8:
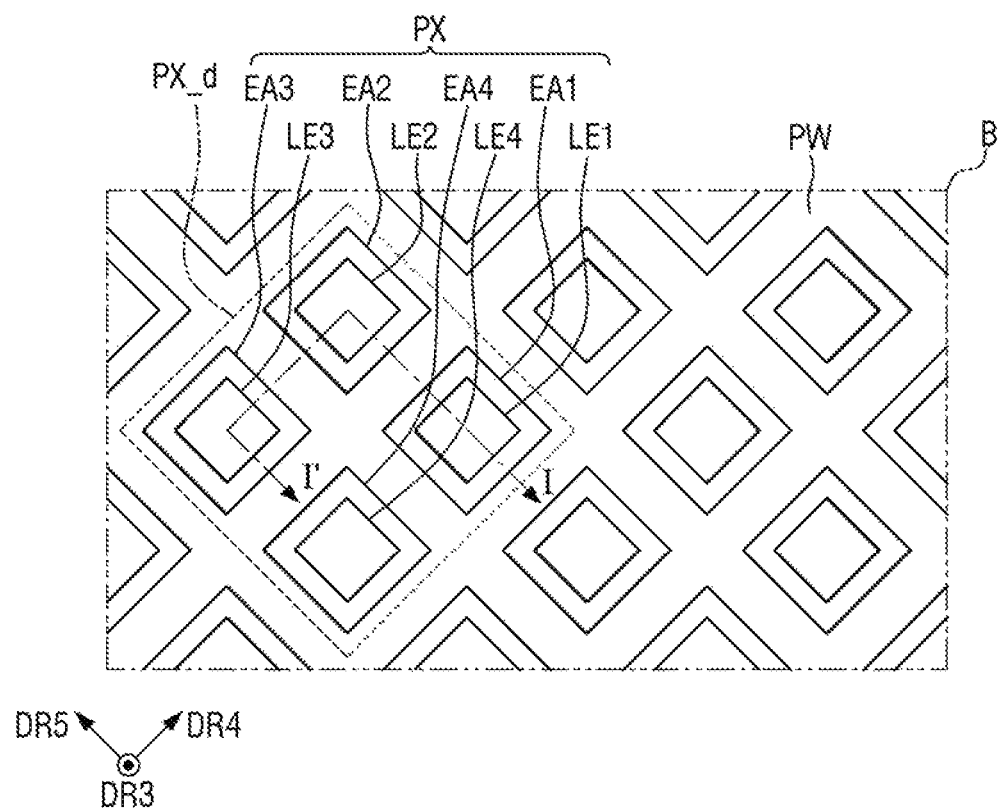
FIG. 8 is a layout diagram illustrating pixels shown in an area B of FIG. 7 in detail.

A light-emitting diode on silicon (LEDoS), where light-emitting diode devices are arranged on a semiconductor circuit board formed in a semiconductor process, has been described as an example of the image display device 110 in some embodiments shown in FIGS. 6 to 8. However, it should be noted that the embodiments of the present disclosure are not limited thereto. Also, the above description has focused on an example in which the image display device 110 according to some embodiments of the present disclosure is an ultra-small light-emitting diode display module (a micro or nano light-emitting diode display module) including an ultra-small light-emitting diode (a micro or nano light-emitting diode), but the embodiments of the present disclosure are not limited thereto.

Referring to FIGS. 6 to 8, a first direction DR1 indicates the transverse direction of the image display device 110, a second direction DR2 indicates the longitudinal direction of the image display device 110, and a third direction DR3 indicates the thickness direction of a display panel 212 or the thickness direction of a semiconductor circuit board/semiconductor circuit substrate 215. In addition, a fourth direction DR4 indicates a diagonal direction of the display panel 212, and a fifth direction DR5 indicates a diagonal direction crossing the fourth direction DR4. In this case, "left," "right," "up," and "down" indicate directions when the display panel 212 is viewed from the top down. For example, "right" indicates one side in the first direction DR1, "left" indicates the other side in the first direction DR1, "up" indicates one side in the second direction DR2, and "down" indicates the other side in the second direction DR2. Also, "top" indicates one side in the third direction DR3, and "bottom" indicates the other side in the third direction DR3.

Referring to FIGS. 6 to 8, the image display device 110 includes a display panel 212 including a display area DA and a non-display area NDA.

The display panel 212 of the image display device 110 may have a rectangular planar form having a long side in the first direction DR1 and a short side in the second direction DR2. However, the planar form of the display panel 212 is not limited thereto and may have a polygonal, circular, oval, or irregular planar form other than a quadrangle.

The display area DA is an area where a picture is displayed, and the non-display area NDA is an area where no picture is displayed. The planar form of the display area DA may follow the planar form of the display panel 212. FIG. 6 illustrates that the planar form of the display area DA is a rectangle. The display area DA may be located in a central area of the display panel 212. The non-display area NDA may be located near the display area DA. The non-display area NDA may be located to surround the display area DA.

A first pad unit PDA1 may be located in the non-display area NDA. The first pad unit PDA1 may be located above the display panel 212 (e.g., with respect to the second direction DR2). The first pad unit PDA1 may include first pads PD1 to be connected to an external circuit board. Meanwhile, a second pad unit PDA2 may be located in the non-display area NDA. The second pad unit PDA2 may be located in a lower portion of the semiconductor circuit board (e.g., with respect to the second direction DR2). The second pad unit PDA2 may include second pads to be connected to an external circuit board. The second pad unit PDA2 may be omitted in other embodiments.

The display area DA of the display panel 212 may include a plurality of pixels PX. Each pixel PX may be defined as a minimum light-emitting unit capable of displaying white light in a corresponding defined pixel area PX_d.

The pixels PX located in the minimum unit capable of displaying white light in the corresponding pixel area PX_d may include a plurality of light-emitting areas EA1, EA2, EA3, and EA4. In some embodiments of the present disclosure, the pixels PX are illustrated as each including four light-emitting areas EA1, EA2, EA3, and EA4 located in the PENTILE™ matrix structure (e.g., a RGBG matrix structure, a PENTILE™ structure, or an RGBG structure, PENTILE™ being a registered trademark of Samsung Display Co., Ltd., Republic of Korea). However, the present disclosure is not limited thereto. For example, each of the plurality of pixels PX may include only three light-emitting areas EA1, EA2, and EA3.

For each pixel area PX_d, the plurality of light-emitting areas EA1, EA2, EA3, and EA4 may be partitioned by partition walls PW. The partition walls PW may be located to surround first to fourth light-emitting devices LE1 to LE4 located in the light-emitting areas EA1, EA2, EA3, and EA4. The partition walls PW may be spaced apart from the first to fourth light-emitting devices LE1 to LE4. The partition walls PW may have a planar form of a mesh or a grid.

FIGS. 7 and 8 illustrate that each of the plurality of light-emitting areas EA1, EA2, EA3, and EA4 defined by the partition walls PW has a planar form of a rhombus forming the PENTILE™ matrix structure, but the embodiments of the present disclosure are not limited thereto. For example, each of the plurality of light-emitting areas EA1, EA2, EA3, and EA4 defined by the partition walls PW may have a polygonal shape such as triangles or quadrangles other than a rhombus, a circular shape, an oval shape, or an irregular shape.

Referring to FIG. 8, among the plurality of light-emitting areas EA1, EA2, EA3, and EA4, the first light-emitting area EA1 may include the first light-emitting device LE1, which emits first light, the second light-emitting area EA2 may include the second light-emitting device LE2, which emits second light, the third light-emitting area EA3 may include the third light-emitting device LE3, which emits third light, and the fourth light-emitting area EA4 may include the fourth light-emitting device LE4, which emits fourth light. The first light may be light in a wavelength band that realizes any one of red, green, and blue colors. Also, the second light may be light in a wavelength band that realizes one of red, green, and blue colors and that is different from that of the first light. Further, the third light may be light in a wavelength band that realizes one of red, green, and blue colors and that is different from those of the first light and the second light. Also, the fourth light may be light in the same wavelength band as that of one of the first to third light.

Although each of the first to fourth light-emitting devices LE1 to LE4 included in the first to fourth light-emitting areas EA1 to EA4 arranged in the PENTILE™ matrix structure is illustrated as having a rhombus-shaped planar form, the embodiments of the present disclosure are not limited thereto. For example, each of the first to fourth light-emitting devices LE1 to LE4 may be formed in a polygonal shape, such as triangles or quadrangles other than a rhombus or in a circular, oval, or irregular form.

Each of the first light-emitting areas EA1 indicates an area that emits the first light. Each of the first light-emitting areas EA1 outputs the first light, which is output from the respective first light-emitting device LE1. As described above, the first light may be light in a wavelength band that realizes any one of red, green, and blue colors. As an example, the first light may be light in a red wavelength band. The red wavelength band may range from about 600 nm to about 750 nm, but the embodiments of the present disclosure are not limited thereto.

Each of the second light-emitting areas EA2 indicates an area that emits the second light. Each of the second light-emitting areas EA2 outputs the second light, which is output from the respective second light-emitting device LE2. The second light may be light in a wavelength band that realizes one of red, green, and blue colors and that is different from that of the first light. As an example, the second light may be light in a blue wavelength band. The blue wavelength band may range from about 370 nm to about 460 nm, but the embodiments of the present disclosure are not limited thereto.

Each of the third light-emitting areas EA3 indicates an area that emits the third light. Each of the third light-emitting areas EA3 outputs the third light, which is output from the respective third light-emitting device LE3. The third light may be light in a wavelength band that realizes one of red, green, and blue colors and that is different from those of the first light and the second light. As an example, the third light may be light in a green wavelength band. The green wavelength band may range from about 480 nm to about 560 nm, but the embodiments of the present disclosure are not limited thereto.

Each of the fourth light-emitting areas EA4 indicates an area that emits the fourth light. Each of the fourth light-emitting areas EA4 outputs the fourth light, which is output from the respective fourth light-emitting device LE4. Here, the fourth light may be light in the same wavelength band as that of one of the first to third light. As an example, the fourth light may be light in the same blue wavelength band as that of the second light, or may be light in the same green wavelength band as that of the third light. The embodiments of the present disclosure are not limited thereto.

The second light-emitting areas EA2 of the pixels PX may be alternately arranged with the fourth light-emitting areas EA4 of other pixels PX that are adjacent in the first direction DR1, which is the transverse direction (or a row direction). Also, the first light-emitting areas EA1 and the third light-emitting areas EA3 of the pixels PX may be alternately arranged in the first direction DR1, which is the transverse direction (or a row direction). On the other hand, the fourth light-emitting areas EA4 of the pixels PX may be alternately arranged with the second light-emitting areas EA2 of other pixels PX that are adjacent in the first direction DR1, which is the transverse direction (or a row direction).

The first light-emitting areas EA1 and the fourth light-emitting areas EA4 are alternately arranged in the fourth direction DR4, which is a first diagonal direction, and also the second light-emitting areas EA2 and the third light-emitting areas EA3 are alternately arranged in the fourth direction DR4. Accordingly, the second light-emitting areas EA2 and the first light-emitting areas EA1 are alternately arranged in the fifth direction DR5, which is a second diagonal direction crossing the first diagonal direction/fourth direction DR4, and also the third light-emitting areas EA3 and the fourth light-emitting areas EA4 are alternately arranged in the fifth direction DR5, so that, as a whole, the pixels PX may be located and arranged in the PENTILE™ matrix structure.

The sizes or planar areas of the first to fourth light-emitting areas EA1 to EA4 of each pixel PX may be the same or different from each other. Likewise, the sizes or planar areas of the first to fourth light-emitting devices LE1 to LE4 formed in the first to fourth light-emitting areas EA1 to EA4 may be the same or different from each other.

For example, the first light-emitting area EA1, the second light-emitting area EA2, the third light-emitting area EA3, and the fourth light-emitting area EA4 may have substantially the same area, but the embodiments of the present disclosure are not limited thereto. For example, the first and second light-emitting areas EA1 and EA2 have different areas, the second and third light-emitting areas EA2 and EA3 have different areas, and also the third and fourth light-emitting areas EA3 and EA4 have different areas. In this case, at least two of the first to fourth light-emitting areas EA1 to EA4 may have the same area.

The distance between the first and second light-emitting areas EA1 and EA2 adjacent to each other in the transverse or diagonal direction, the distance between the second and third light-emitting areas EA2 and EA3, the distance between the third and fourth light-emitting areas EA3 and EA4, and the distance between the first and fourth light-emitting areas EA1 and EA4, may be the same, or may be respectively different from one or more others according to different areas. The embodiments of the present disclosure are not limited thereto.

Also, the example in which the first light-emitting area EA1 emits the first light, the second light-emitting area EA2 emits the second light, the third light-emitting area EA3 emits the third light, and the fourth light-emitting area EA4 emits the same light as one of the first to third light is not limited thereto. In some embodiments, at least one of the first to fourth light-emitting areas EA1 to EA4 may emit fifth light. Here, the fifth light may be light in a yellow wavelength band. That is, the main peak wavelength of the fifth light may range from about 550 nm to about 600 nm, but the embodiments of the present disclosure are not limited thereto.

Figure 9:
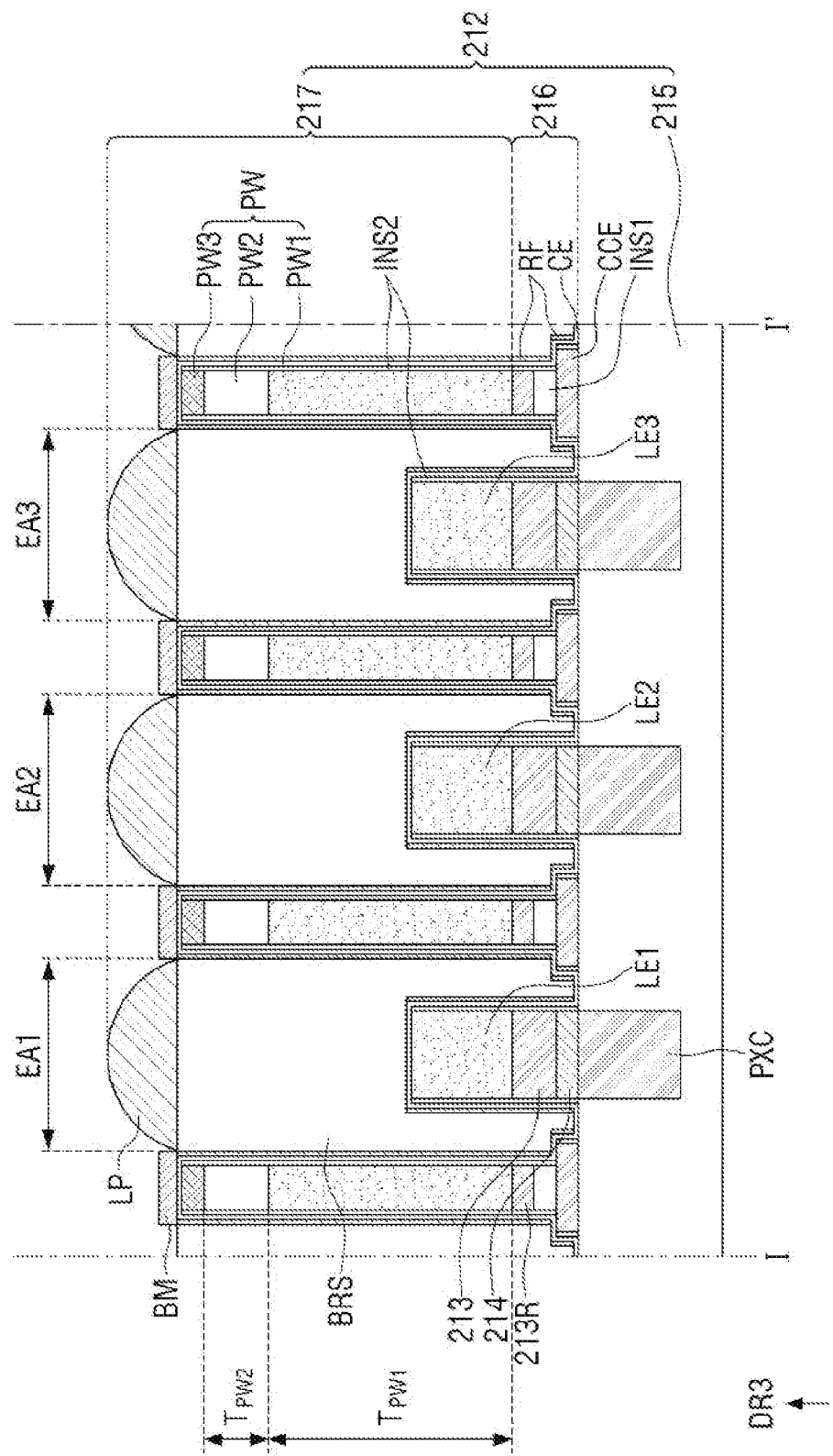
FIG. 9 is a cross-sectional view illustrating an example of an image display device taken along the line I-I' of FIG. 8.

FIG. 9 is a cross-sectional view illustrating an example of the image display device taken along the line I-I' of FIG. 8. Also, FIG. 10 is an enlarged cross-sectional view illustrating an example of the light-emitting device of FIG. 9 in detail.

Figure 10:
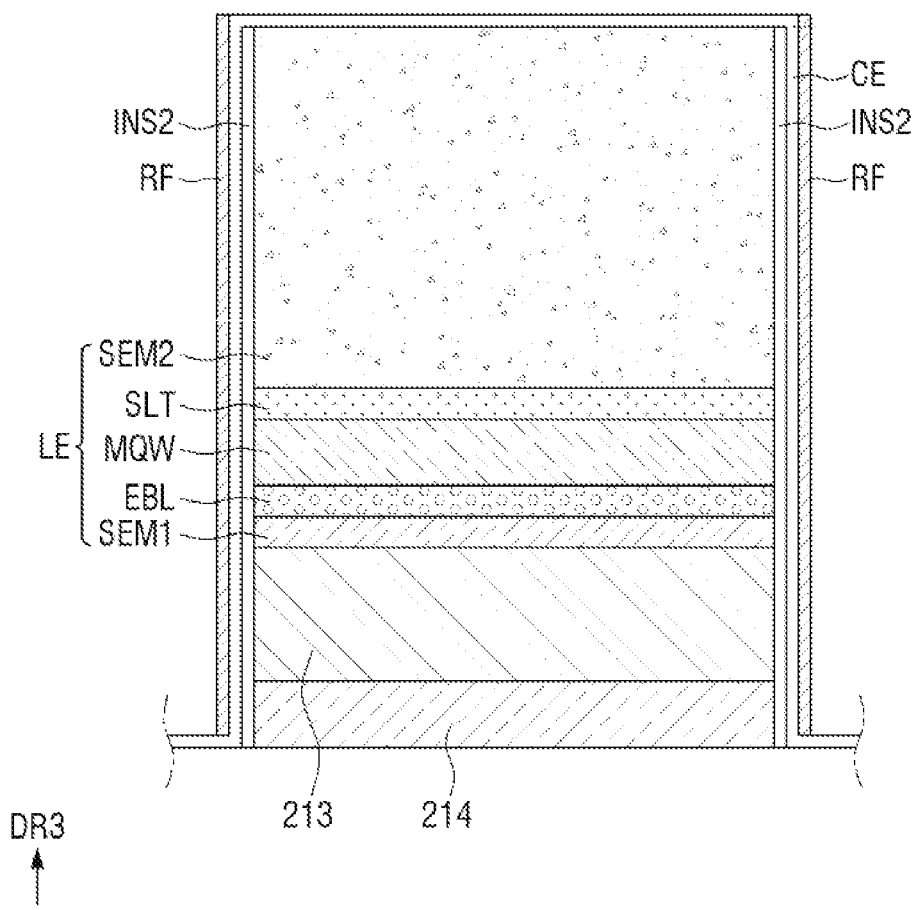
FIG. 10 is an enlarged cross-sectional view illustrating an example of the light-emitting device of FIG. 9 in detail.

Referring to FIGS. 9 and 10, the display panel 212 may include a semiconductor circuit board 215, a conductive connection layer 216, and a light-emitting device layer 217.

The semiconductor circuit board 215 may include a plurality of pixel circuit units PXC. The conductive connection layer 216 may include connection electrodes 213, first pads PD1, a common connection electrode CCE, a first insulating layer INS1, and a conductive pattern 213R.

The semiconductor circuit board 215 may be a silicon wafer substrate formed using a semiconductor process. The plurality of pixel circuit units PXC of the semiconductor circuit board 215 may be formed using a semiconductor process.

The plurality of pixel circuit units PXC may be located in a display area DA (see FIG. 6). Each of the plurality of pixel circuit units PXC may be connected to a corresponding pixel electrode 214. That is, the plurality of pixel circuit units PXC and the plurality of pixel electrodes 214 may be connected in one-to-one correspondence. Each of the plurality of pixel circuit units PXC may overlap a corresponding one of the light-emitting devices LE1 to LE4 in the third direction DR3. Various other modified circuit structures, such as a 3T1C structure, a 2T1C structure, a 7T1C structure, and a 6T1C structure, may be applied to each of the pixel circuit units PXC.

Each of the pixel electrodes 214 may be located on a corresponding pixel circuit unit PXC. Each of the pixel electrodes 214 may be an exposed electrode, which is exposed from a corresponding pixel circuit unit PXC. That is, each of the pixel electrodes 214 may protrude from the top surface of a corresponding pixel circuit unit PXC. Each of the pixel electrodes 214 may be integrally formed with a corresponding pixel circuit unit PXC. Each of the pixel electrodes 214 may receive a pixel voltage or an anode voltage from a corresponding pixel circuit unit PXC. The pixel electrodes 214 may be formed of aluminum (Al).

Each of the connection electrodes 213 may be located on a corresponding pixel electrode 214. The connection electrodes 213 may include a metal material for bonding the pixel electrodes 214 to each of the light-emitting devices LE1 to LE4.

The common connection electrode CCE may be spaced apart from the pixel electrodes 214 and the connection electrodes 213. The common connection electrode CCE may be arranged to surround the pixel electrodes 214 and the connection electrodes 213 (e.g., in a plan view). The common connection electrodes CCE may be connected to one of the first pads PD1 of the first pad unit PDA1 of the non-display area NDA to receive a common voltage. The common connection electrode CCE may include the same material as the connection electrodes 213.

The first insulating layer INS1 may be located on the common connection electrode CCE. The width of the first insulating layer INS1 may be smaller than the width of the common connection electrode CCE in the first direction DR1 and/or the second direction DR2. Thus, a portion of the upper surface of the common connection electrode CCE may be exposed by not being covered by the first insulating layer INS1. The portion(s) of the upper surface of the common connection electrode CCE that is not covered by the first insulating layer INS1, but is instead exposed, may be in contact with a common electrode CE. Therefore, the common electrode CE may be connected to the common connection electrode CCE.

The conductive pattern 213R may be located on the first insulating layer INS1. The conductive pattern 213R may be located between the first insulating layer INS1 and the partition wall PW (e.g., in the thickness direction DR3). The width of the conductive pattern 213R may be substantially the same as the width of the first insulating layer INS1 or as the width of the partition wall PW. The conductive pattern 213R corresponds to a residue formed by the same process as those of the connection electrodes 213 and the common connection electrode CCE.

The light-emitting device layer 217 may include light-emitting devices LE1, LE2, LE3, and LE4, partition walls PW, a second insulating layer INS2, a common electrode CE, a reflective layer RF, a light-blocking member BM, and optical patterns LP.

The light-emitting device layer 217 may include first to fourth light-emitting areas EA1 to EA4 partitioned by the partition walls PW. Elements of at least one of the light-emitting devices LE and the optical patterns LP may be located in each of the first to fourth light-emitting areas EA1 to EA4.

The light-emitting devices LE1, LE2, and LE3 of FIG. 9 may be located on the connection electrodes 213 in the light-emitting areas EA1 to EA3, respectively. The length (or height) of each of the light-emitting devices LE1, LE2, and LE3 in the third direction DR3 may be greater than a width in the transverse direction. A horizontal length indicates the length in the first direction DR1 or the length in the second direction DR2. For example, the length of the first light-emitting device LE1 in the third direction DR3 may be about 1 µm to about 5 µm.

Referring to FIG. 10, each of the light-emitting devices LE1, LE2, LE3, and LE4 includes a first semiconductor layer SEM1, an electron blocking layer EBL, an active layer MQW, a superlattice layer SLT, and a second semiconductor layer SEM2. The first semiconductor layer SEM1, the electron blocking layer EBL, the active layer MQW, the superlattice layer SLT, and the second semiconductor layer SEM2 may be sequentially stacked in the third direction DR3.

The first semiconductor layer SEM1 may be located on the connection electrode 213. The first semiconductor layer SEM1 may be a semiconductor layer doped with first conductive dopants such as Mg, Zn, Ca, Se, and Ba. For example, the first semiconductor layer SEM1 may be p-GaN doped with p-type Mg. The thickness Tsem1 of the first semiconductor layer SEM1 may be about 30 nm to about 200 nm.

The electron blocking layer EBL may be located on the first semiconductor layer SEM1. The electron blocking layer EBL may be a layer for suppressing or preventing too many electrons from flowing into the active layer MQW. For example, the electron blocking layer EBL may be p-AlGaN doped with p-type Mg. The thickness Tsem1 of the electron blocking layer EBL may be about 10 nm to about 50 nm. The electron blocking layer EBL may be omitted.

The active layer MQW may be classified as first to third active layers. Each of the first to third active layers may include a material having a single- or multi-quantum well structure. When including a material having a multi-quantum well structure, each of the first to third active layers may have a structure in which a plurality of well layers and a plurality of barrier layers are alternately stacked. In this case, the first active layer may contain InGaN or GaAs, and the second active layer and the third active layer may contain InGaN. However, the present disclosure is not limited thereto. Here, the first active layer may emit light by recombining electron-hole pairs according to an electric signal. The first active layer may emit first light with a main peak wavelength ranging from about 600 nm to about 750 nm, that is, light in a red wavelength band. The second active layer may emit light by combining electron-hole pairs according to an electric signal. The second active layer may emit third light with a main peak wavelength ranging from about 480 nm to about 560 nm, that is, light in a green wavelength band. The third active layer may emit light by combining electron-hole pairs according to an electric signal. The third active layer may emit second light with a main peak wavelength ranging from about 370 nm to about 460 nm, that is, light in a blue wavelength band.

In the first to third active layers, the color of emitted light may vary depending on the content of indium. For example, the wavelength band of light emitted from each of the first to third active layers may be shifted closer to a red wavelength band as the content of indium decreases and may be shifted closer to a blue wavelength band as the content of indium increases. The content of indium (In) of the first active layer may be higher than the content of indium (In) of the second active layer, and the content of indium (In) of the second active layer may be higher than the content of indium (In) of the third active layer. For example, the content of indium (In) of the third active layer may be about 15%, the content of indium (In) of the second active layer may be about 25%, and the content of indium (In) of the first active layer may be greater than or equal to about 35%.

Because the color of emitted light of each of the first to third active layers may vary depending on the content of indium, the light-emitting device layer 217 of each of the light-emitting devices LE1, LE2, and LE3 may emit the first light, the second light, and the third light in the same wavelength, or may emit the respective light differently, depending on the content of indium. For example, when the content of indium (In) in the first to third active layers of the first light-emitting device LE1 is within about 15%, the first light-emitting device LE1 may emit the first light in the red wavelength band with a main peak wavelength ranging from about 600 nm to about 750 nm. Also, when the content of indium (In) in the first to third active layers of the second light-emitting device LE2 is about 25%, the second light-emitting device LE2 may emit the second light in the green wavelength band with a main peak wavelength ranging from about 480 nm to about 560 nm. Also, when the content of indium (In) in the first to third active layers of the third light-emitting device LE3 is greater than or equal to about 35%, the third light-emitting device LE3 may emit the third light in the blue wavelength band with a main peak wavelength ranging from about 370 nm to about 460 nm. By adjusting and setting the content of indium (In) in the first to third active layers of the fourth light-emitting device LE4, the fourth light-emitting device LE4 may emit the first to third light or may emit fourth light.

The superlattice layer SLT may be located on the active layer MQW. The superlattice layer SLT may be a layer for releasing stress between the second semiconductor layer SEM2 and the active layer MQW. For example, the superlattice layer SLT may be formed of InGaN or GaN. The thickness Tslt of the superlattice layer SLT may be about 50 nm to about 200 nm. The superlattice layer SLT may be omitted.

The second semiconductor layer SEM2 may be located on the superlattice layer SLT. The second semiconductor layer SEM2 may be doped with second conductive dopants, such as Si, Ge, and Sn. For example, the second semiconductor layer SEM2 may be n-GaN doped with n-type Si. The thickness Tsem2 of the second semiconductor layer SEM2 may be about 2 μm to about 4 μm.

The partition walls PW may be spaced apart from the light-emitting devices LE1 to LE4 located in the first to fourth light-emitting areas EA1 to EA4. The partition walls PW may be located to surround (e.g., surround in plan view) the light-emitting devices LE1 to LE4 located in the first to fourth light-emitting areas EA1 to EA4.

The partition walls PW may be located on the common connection electrodes CCE. The width of the partition walls in the first direction DR1 and the second direction DR2 may be smaller than the width of the common connection electrode. The partition walls PW may be spaced apart from the light-emitting devices LE.

The partition walls PW may include a first partition wall PW1, a second partition wall PW2, and a third partition wall PW3. The first partition wall PW1 may be located on the first insulating layer INS1. Because the first partition wall PW1 is formed in the same process as that of the light-emitting device LE, at least a partial area of the first partition wall PW1 may contain the same material as the light-emitting device LE.

The second insulating layer INS2 may be located on side surfaces of the common connection electrode CCE, side surfaces of the partition walls PW, side surfaces of the pixel electrodes 214, side surfaces of the connection electrodes 213, and side surfaces of the light-emitting devices LE1 to LE4. The second insulating layer INS2 may be formed as an inorganic layer such as a silicon oxide layer ($SiO_2$). The thickness of the second insulating layer INS2 may be about 0.1 μm.

The common electrode CE may be located on upper surfaces and side surfaces of the light-emitting devices LE1 to LE4 and upper surfaces and side surfaces of the partition walls PW (e.g., may surround side surfaces of the light-emitting devices LE1 to LE4 and of the partition walls PW with the second insulating layer INS2 therebetween). That is, the common electrode CE may be located to cover the upper surfaces and side surfaces of the light-emitting devices LE1 to LE4 and the upper surfaces and side surfaces of the partition walls PW.

The common electrode CE may be in contact with the second insulating layer INS2 located on the side surfaces of the common connection electrode CCE, the side surfaces of the partition walls PW, the side surfaces of the pixel electrodes 214, the side surfaces of the connection electrodes 213, and the side surfaces of the light-emitting devices LE1 to LE4. Also, the common electrode CE may be in contact with the upper surface of the common connection electrode CCE, the upper surfaces of the light-emitting devices LE1 to LE4, and upper surfaces of the partition walls PW.

The common electrode CE may be in contact with the upper surface of the common connection electrode CCE at portions that are exposed and not covered with the second insulating layer INS2, and may be in contact with the upper surfaces of the light-emitting devices LE1 to LE4. Therefore, the common voltage supplied to the common connection electrode CCE may be applied to the light-emitting devices LE1 to LE4. That is, each of the light-emitting devices LE1 to LE4 may have one end configured to receive a pixel voltage or an anode voltage of the pixel electrode 214 through the connection electrodes 213, and the other end configured to receive a common voltage through the common electrode CE. The light-emitting device LE may emit light with a luminance (e.g., a predetermined luminance) according to a voltage difference between the pixel voltage and the common voltage.

The reflective layer RF may be located on (e.g., may surround in a plan view) the side surfaces of the common connection electrode CCE, side surfaces of the partition walls PW, side surfaces of the pixel electrodes 214, side surfaces of the connection electrodes 213, and side surfaces of the light-emitting devices LE1 to LE4 (e.g., with the second insulating layer INS2 and the common electrode CE therebetween). The reflective layer RF serves to reflect light traveling not in the upper direction, but instead traveling (e.g., partially) in the longitudinal or transverse direction, among the light emitted from the light-emitting devices LE1 to LE4. The reflective layer RF may include a metal material having high reflectivity, such as aluminum (Al). The thickness of the reflective layer RF may be about 0.1 μm.

A base resin BRS may be located on a passivation layer in each of the light-emitting devices LE1 to LE4. The base resin BRS may contain a transparent organic material. The base resin BRS may further include a scatterer for scattering the light of the light-emitting devices LE1 to LE4 in random directions. In this case, the scatterer may contain metal oxide particles or organic particles.

A light-blocking member BM may be located on the partition wall PW. The light-blocking member BM may contain a light-blocking material. The light-blocking member BM may be located between the adjacent light-emitting areas EA1, EA2, EA3, and EA4 to reduce or prevent mixture of colors of light emitted in different wavelength bands from the light-emitting device LE1 to LE4 of the light-emitting areas EA1, EA2, EA3, and EA4. Also, the light-blocking member BM may absorb at least a portion of external light incident on the light-emitting device layer 217 from the outside to reduce reflection of the external light. The light-blocking member BM may be positioned on the partition wall PW and may be located to extend to each of the light-emitting areas EA1, EA2, EA3, and EA4. That is, the width of the light-blocking member BM may be greater than the width of the partition wall PW.

Each optical pattern LP may be selectively located on a corresponding one of the light-emitting areas EA1, EA2, EA3, and EA4. Each optical pattern LP may be directly located on the base resin BRS of each of the light-emitting areas EA1, EA2, EA3, and EA4, respectively. Each optical pattern LP may have a shape protruding in an upper direction (e.g., in a direction from the light-emitting devices LE1 to LE4 to the corresponding optical pattern LP). For example, the cross-sectional shape of each optical pattern LP may include the shape of an upward convex lens. Each optical pattern LP may be located on the base resin BRS and the light-blocking member BM that are respectively located below. The width of each optical pattern LP may be equal to, greater than, or smaller than the width of each of the light-emitting areas EA1, EA2, EA3, and EA4. In the light-emitting areas EA1, EA2, EA3, and EA4, the optical patterns LP may collect first to third light or fourth light that has passed through the base resins BRS.

Figure 11:
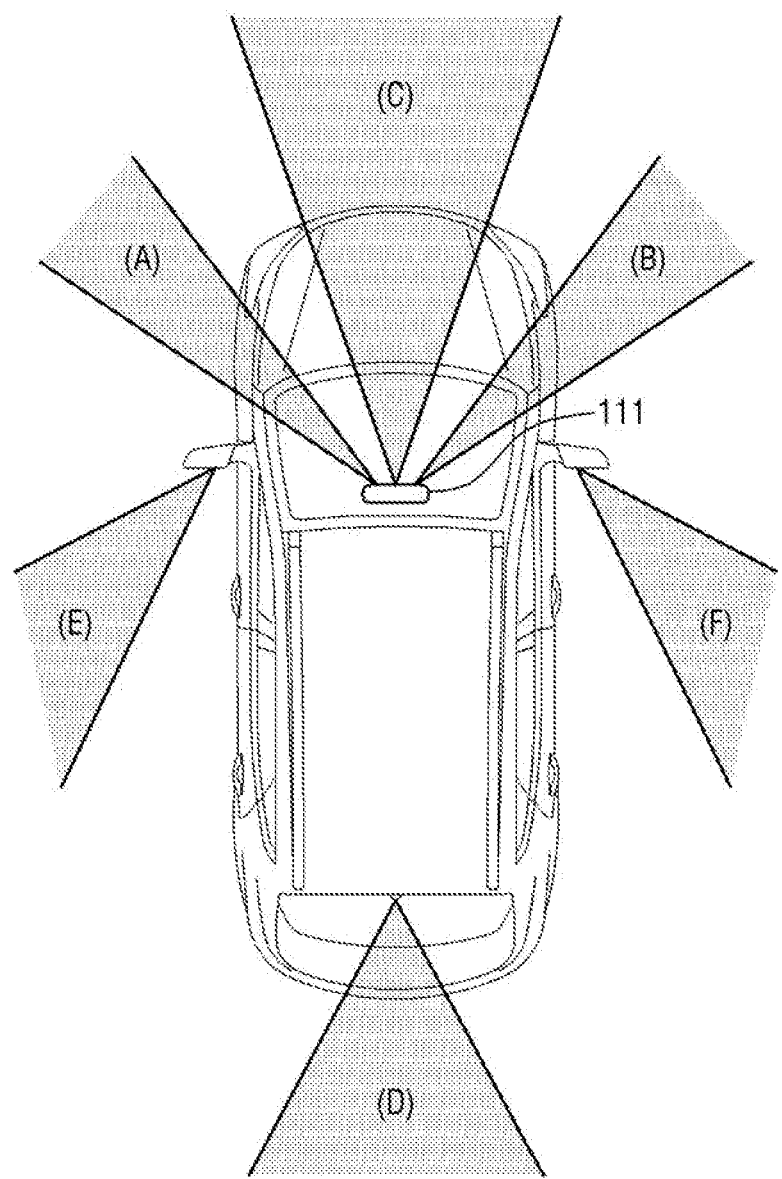
FIG. 11 is a diagram illustrating sensing areas near a vehicle sensed by a sensing module of FIG. 4.

FIG. 11 is a diagram illustrating sensing areas near a vehicle sensed by the sensing module of FIG. 4.

Referring to FIG. 11, the depth sensors SS2 may be arranged on a rearview mirror and/or a side-view mirror in a forward direction C, a rearward direction D, a diagonal direction A, another diagonal direction B (e.g., with respect to a vehicle), a side direction E (e.g., a side mirror direction), another side direction F, and the like. Thus, the depth sensors SS2 may detect, in real time, signals for sensing distances to objects, vehicles, people, animals, and the like located in at least one direction among the vehicle forward direction C, the rearward direction D, the diagonal direction A, the other diagonal direction B, the side direction E, and the other direction F.

Also, the image sensors SS1, such as a camera, may be arranged on a rearview mirror and/or a side-view mirror in the vehicle forward direction C, the rearward direction D, the diagonal direction A, the other diagonal direction B, the side direction E, the other direction F, and the like. Thus, the image sensors SS1 may detect, in real time, images and image data in at least one direction among the vehicle forward direction C, the rearward direction D, the diagonal direction A, the other diagonal direction B, the side direction E, and the other direction F.

Figure 12:
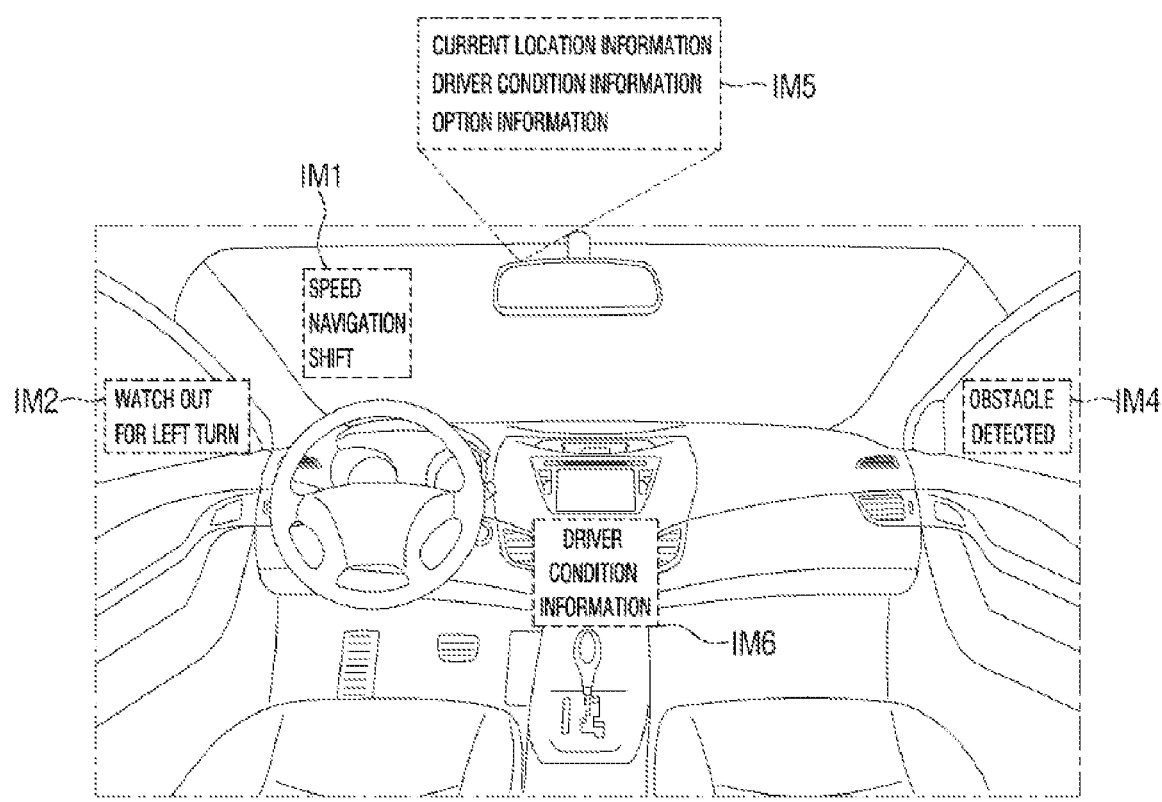
FIG. 12 is a diagram illustrating a plurality of display areas in which content images are displayed by a plurality of display modules illustrated in FIG. 4.

FIG. 12 is a diagram illustrating a plurality of display areas in which content images are displayed by a plurality of display modules illustrated in FIG. 4. Also, FIG. 13 is a diagram illustrating a display area in which a content image is displayed by one of the plurality of display modules shown in FIG. 4.

Figure 13:
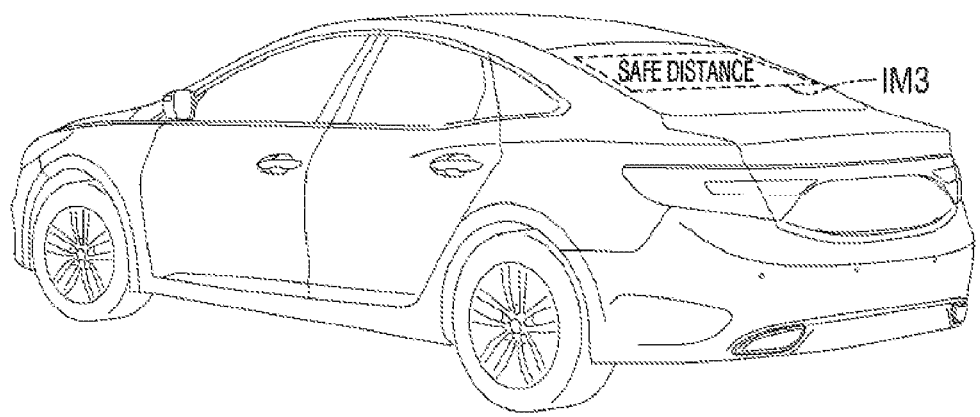
FIG. 13 is a diagram illustrating a display area in which a content image is displayed by one of the plurality of display modules shown in FIG. 4.

Referring to FIGS. 12 and 13, a first display module DP1 provides an AR content image to a first image display area IM1 of a front car window of a driver so that the AR content image may be perceived by the driver's eyes through an optical waveguide, a transparent lens, or a reflective member of the first image display area IM1.

The content generation control unit 132 may generate a first AR content image including at least one of control state information of the vehicle, and directionality information, location information, and/or distance information of nearby objects, and may transmit the first AR content image to the display control unit 131. Thus, the display control unit 131 may control the driving of the first display module DP1 such that the first AR content image is displayed in the first image display area IM1.

A second display module DP2 provides an AR content image to a second image display area IM2 of a side car window of a driver seat so that the AR content image may be perceived by a driver's eyes through an optical waveguide, a transparent lens, or a reflective member of the second image display area IM2.

The content generation control unit 132 may generate a second AR content image including at least one of directionality information, location information of the nearby objects, distance information of the nearby objects, and/or guidance information or caution information corresponding to distance information, and may transmit the second AR content image to the display control unit 131. Thus, the display control unit 131 may control the driving of the second display module DP2, such that the second AR content image is displayed in the second image display area IM2.

A third display module DP3 provides an AR content image to a third image display area IM3 of a rear car window of the vehicle so that the AR content image may be viewed by a driver's eyes or a passenger's eyes through an optical waveguide, a transparent lens, or a reflective member of the third image display area IM3. The content generation control unit 132 may generate a third AR content image including at least one of control state information of the vehicle, and guidance information or caution information corresponding to real-time driving information, and may transmit the third AR content image to the display control unit 131. Thus, the display control unit 131 may control the driving of the third display module DP3 such that the third AR content image is displayed in the third image display area IM3.

A fourth display module DP4 provides an AR content image to a fourth image display area IM4 of a side car window of a passenger seat so that the AR content image may be viewed by a passenger's eyes through an optical waveguide, a transparent lens, or a reflective member of the fourth image display area IM4. The content generation control unit 132 may generate a fourth AR content image including directionality information, distance information, and guidance information of the nearby objects, and may transmit the fourth AR content image to the display control unit 131. Thus, the display control unit 131 may control the driving of the fourth display module DP4 such that the fourth AR content image is displayed in the fourth image display area IM4.

A fifth display module DP5 provides an AR content image in a fifth image display area IM5 of a sunroof or a reflective member in a ceiling so that the AR content image is displayed through a transparent lens and an optical waveguide of the sunroof or the reflective member in the ceiling. The content generation control unit 132 may generate a fifth AR content image including guidance information or caution information corresponding to real-time driving information, and may transmit the fifth AR content image to the display control unit 131. Thus, the display control unit 131 may control the driving of the fifth display module DP5 such that the fifth AR content image is displayed in the fifth image display area IM5.

A sixth display module DP6 provides an AR content image in a sixth image display area such as a center fascia, a dashboard, or a console box so that the AR content image is displayed through a reflective member of the center fascia, the dashboard, the console box, or the like. The content generation control unit 132 may generate a sixth AR content image including guidance information or caution information corresponding to real-time driving information, and may transmit the sixth AR content image to the display control unit 131. Thus, the display control unit 131 may control the driving of the sixth display module DP6 such that the sixth AR content image is displayed in the sixth image display area IM6.

Figure 14:
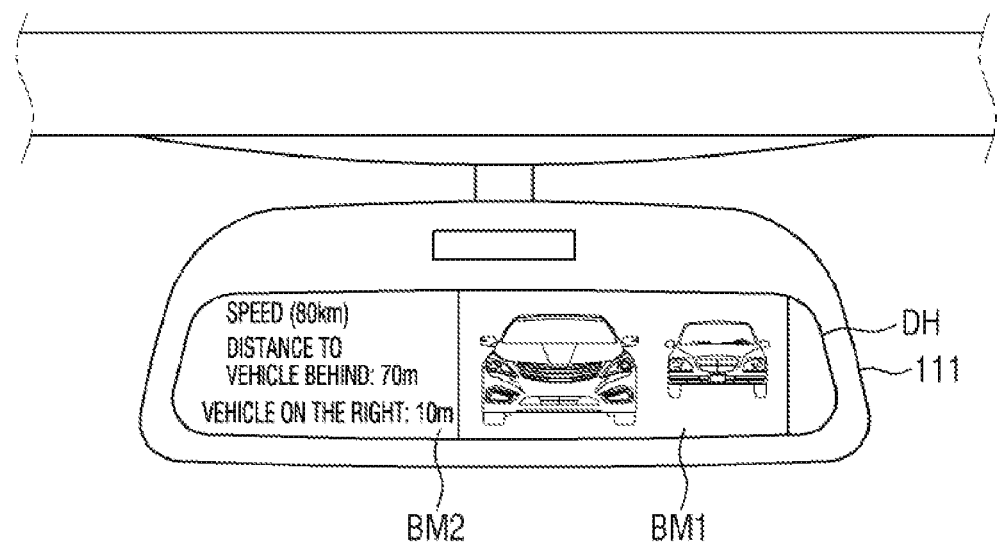
FIG. 14 is a diagram illustrating an example in which a display module is applied to a mirror display unit of a rearview mirror shown in FIGS. 1 to 3.

FIG. 14 is a diagram illustrating an example in which a display module is applied to a mirror display unit of a rearview mirror shown in FIGS. 1 to 3.

Referring to FIG. 14, a plurality of mirror information display modules BM1 and BM2 may be formed in a mirror display unit DH of the rearview mirror instead of a simple mirror. The plurality of mirror information display modules BM1 and BM2 may include a micro LED, a nano LED, an organic light-emitting display device, an inorganic light-emitting display device, a quantum dot light-emitting display device, and the like.

The content generation control unit 132 transmits, to the display control unit 131, a vehicle's rearview image data input through the sensing module 120 so that the vehicle's rearview image is displayed on at least one mirror information display module BM1 under the control of the display control unit 131.

Also, the content generation control unit 132 may generate information data including vehicle driving situation information, distance information of objects or vehicles behind, etc., and may transmit the information data to the display control unit 131. Thus, the content generation control unit 132 may enable the information data to be displayed in at least one mirror information display module BM2 under the control of the display control unit 131.

Figure 15:
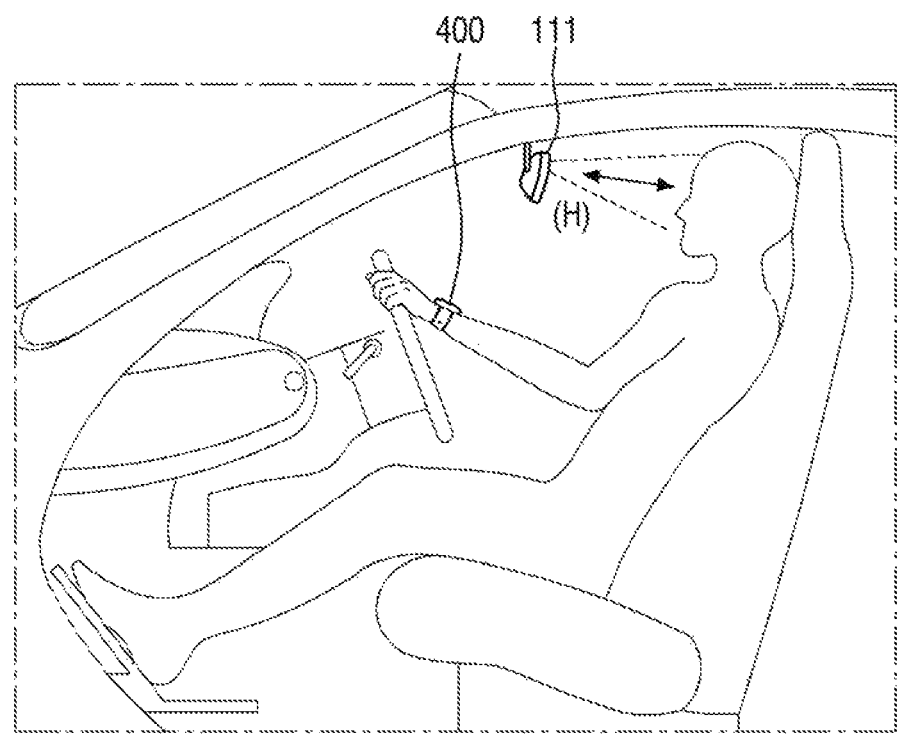
FIG. 15 is a diagram illustrating a method of sensing a driver's biometric information by an AR-content-providing apparatus according to some embodiments.

FIG. 15 is a diagram illustrating a method of sensing a driver's biometric information by an AR-content-providing apparatus according to some embodiments. Also, FIG. 16 is a diagram illustrating a biometric information display area and display method through the sensing of the driver's biometric information of FIG. 15.

Figure 16:
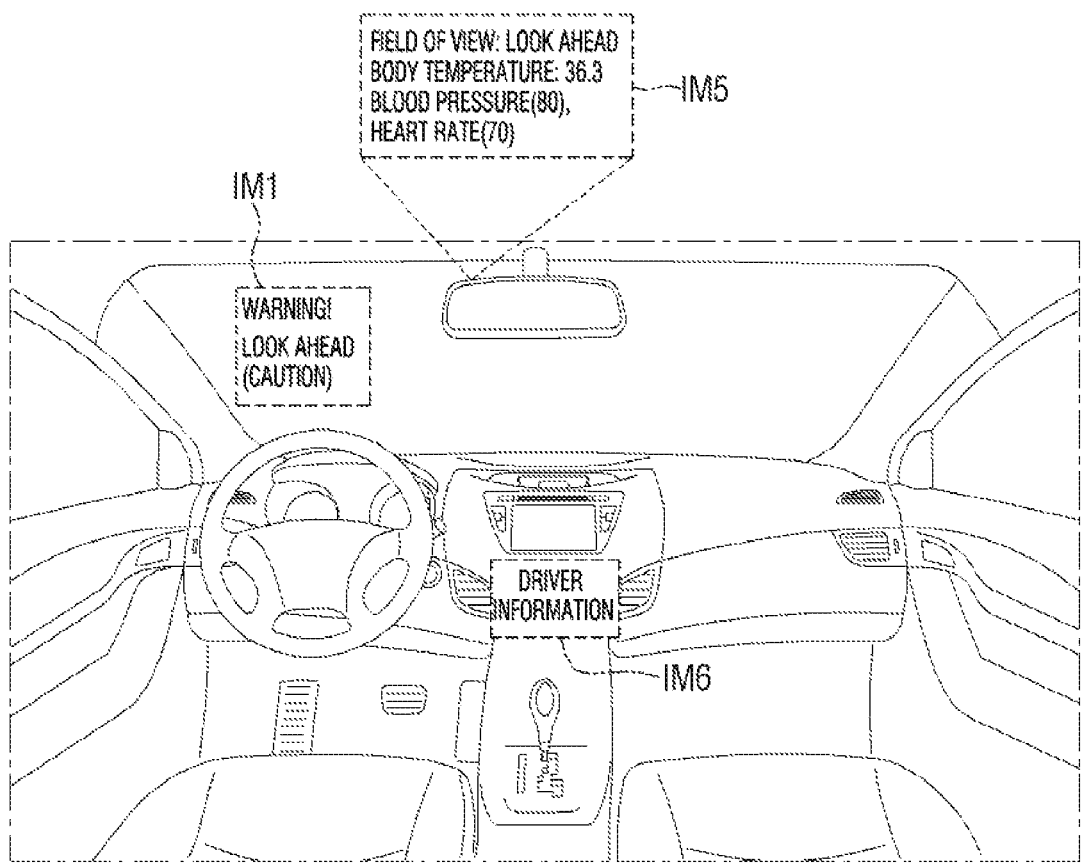
FIG. 16 is a diagram illustrating a biometric information display area and display method through the sensing of a driver's biometric information of FIG. 15.

Referring to FIGS. 15 and 16, the communication unit 135 of the AR-content-providing apparatus 111 may be paired with external wavelet display devices 400 in at least one communication scheme among a BLUETOOTH® communication scheme, an infrared communication scheme, a Wi-Fi-Direct® communication scheme, and an NFC communication scheme to perform wireless communication.

The communication unit 135 may receive biosignal information, such as heart rate information, blood pressure information, and body temperature information, from the wavelet display device 400, and may transmit the biosignal information to the content generation control unit 132. Subsequently, the content generation control unit 132 may generate AR content data including the biosignal information, such as heart rate information, blood pressure information, and body temperature information, set the AR content data including the biosignal information to be displayed on at least one display module DP1 to DP6, and transmit the AR content data to the display control unit 131.

The display control unit 131 may modulate a resolution and a driving frequency such that the AR content data including the biosignal information is displayed on at least one display module DP1 to DP6 and transmit the AR content data. Thus, as shown in FIG. 16, passengers may check the driver's biosignal information displayed on at least one of the first to sixth image display areas IM1 to IM6 in real time.

At least one biosensor SS3 included in the sensing module 120 is located in a direction H facing the driver's eyes to detect infrared rays reflected from the driver's eye or pupil in real time. Also, pupil detection signals may be transmitted to the content generation control unit 132 of the control module 130 according to a result of detecting infrared rays reflected from the driver's eye or pupil.

The content generation control unit 132 may generate AR content data including driver condition information and guidance information according to the pupil detection signals, may set the AR content data including the driver condition information and the guidance information to be displayed on at least one display module DP1 to DP6, and may transmit the AR content data to the display control unit 131.

The display control unit 131 controls at least one display module DP1 to DP6 so that AR content data including driver condition information, and may guide information is displayed in at least one image display area IM1 to IM6, thereby allowing passengers to check the driver condition information and the guidance information.

In response to the characteristics of the AR content data, that is, the driver's biosignal information, driver condition information, and guidance information, the electronic device control unit 136 may operate at least one acoustic device 311, at least one vibration device 312, at least one fragrance device 313, etc.

Figure 17:
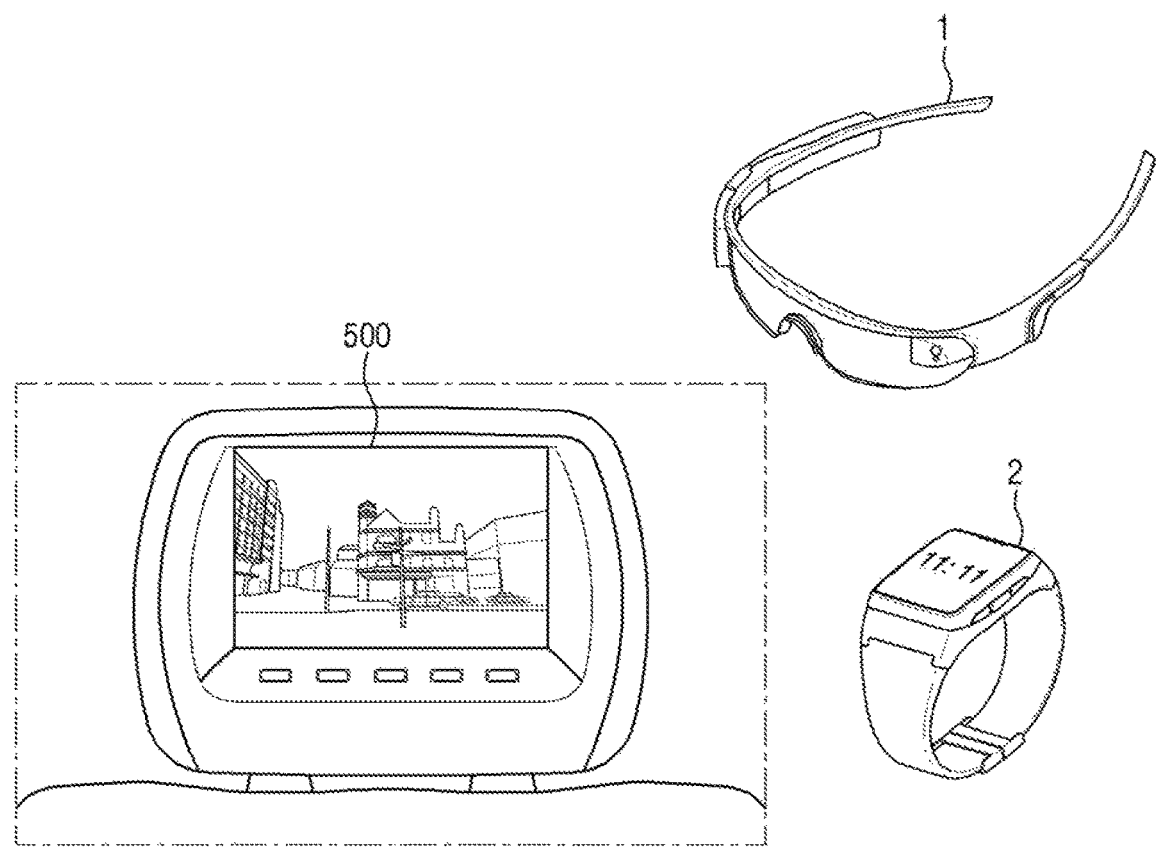
FIG. 17 is a diagram illustrating external display devices that display AR content shared by an AR-content-providing apparatus according to some embodiments.

FIG. 17 is a diagram illustrating external display devices that display AR content shared by an AR-content-providing apparatus according to some embodiments.

Referring to FIG. 17, a content display device that displays AR content shared by the AR-content-providing apparatus 111 may be a flat-panel content display device 500 located inside a vehicle, or may be a glasses-type virtual reality device 1 or a watch-type smart device 2 used by a driver, a passenger or the like.

Like the image display device 110 included in the AR-content-providing apparatus 111, the content display devices such as the flat-panel content display device 500, the glasses-type virtual reality device 1, and the watch-type smart device 2 may include a micro LED. In contrast, the content display devices such as the flat-panel content display device 500, the glasses-type virtual reality device 1, and the watch-type smart device 2 may include a nano LED, an organic light-emitting display device, an inorganic light-emitting display device, a quantum dot light-emitting display device, etc.

The content display devices such as the flat-panel content display device 500, the glasses-type virtual reality device 1, and the watch-type smart device 2 may display, on a screen, AR content (e.g., an AR content image) that is transmitted and received from the AR-content-providing apparatus 111 in real time. When AR content data is received from the AR-content-providing apparatus 111, the at least one content display device may output the AR content data to a screen and a speaker at the same timing.

Figure 18:
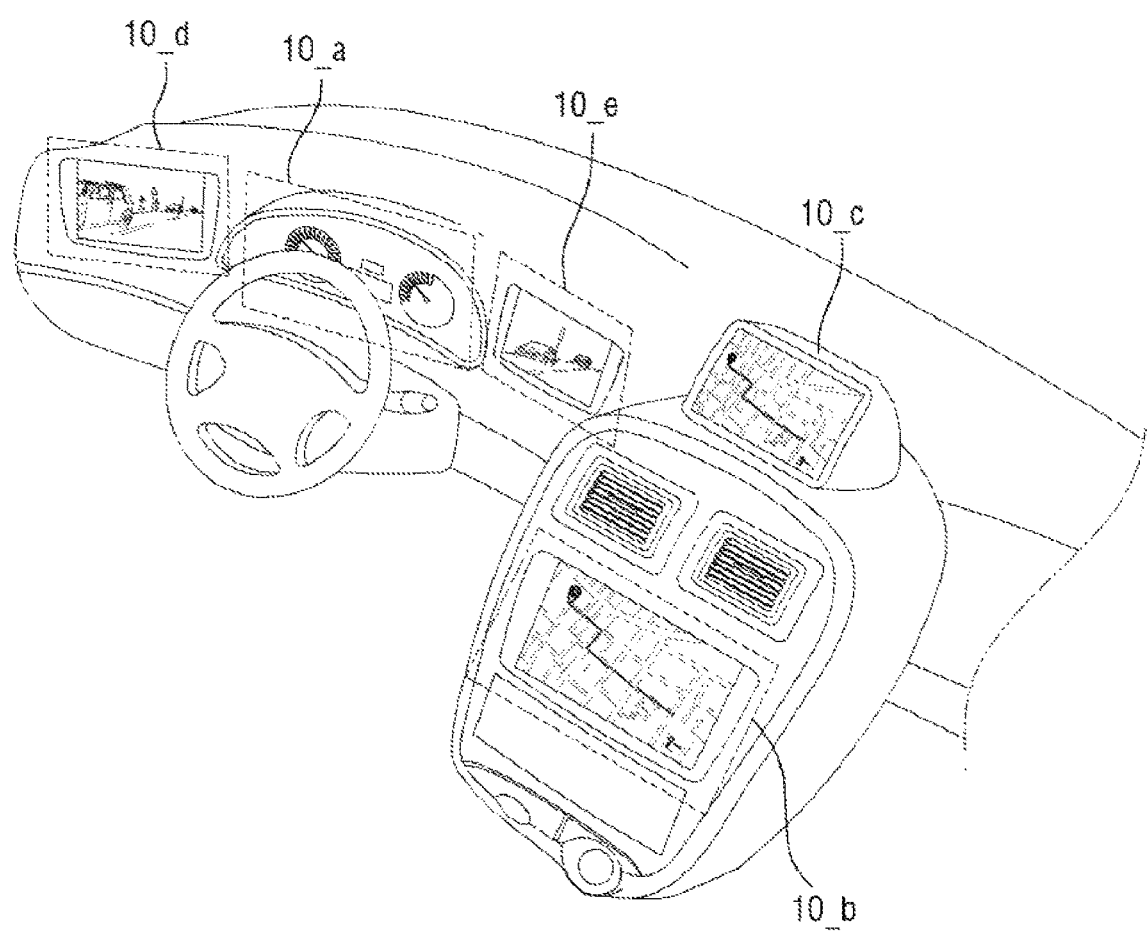
FIG. 18 is an diagram illustrating a vehicle dashboard and a center fascia including a display module according to some embodiments.

FIG. 18 is an diagram illustrating a vehicle dashboard and a center fascia including a display module according to some embodiments.

Referring to FIG. 18, an image display device 110 included in the AR-content-providing apparatus 111 of the present disclosure may be applied to an dashboard 10_a of a vehicle, applied to a center fascia 10_b of a vehicle, or applied to a center information display (CID) 10_c placed on a dashboard of a vehicle. Also, the image display device 110 according to some embodiments may be applied to rearview mirror displays 10_d and 10_e, a navigation device, etc., instead of a side-view mirror of a vehicle.

Figure 19:
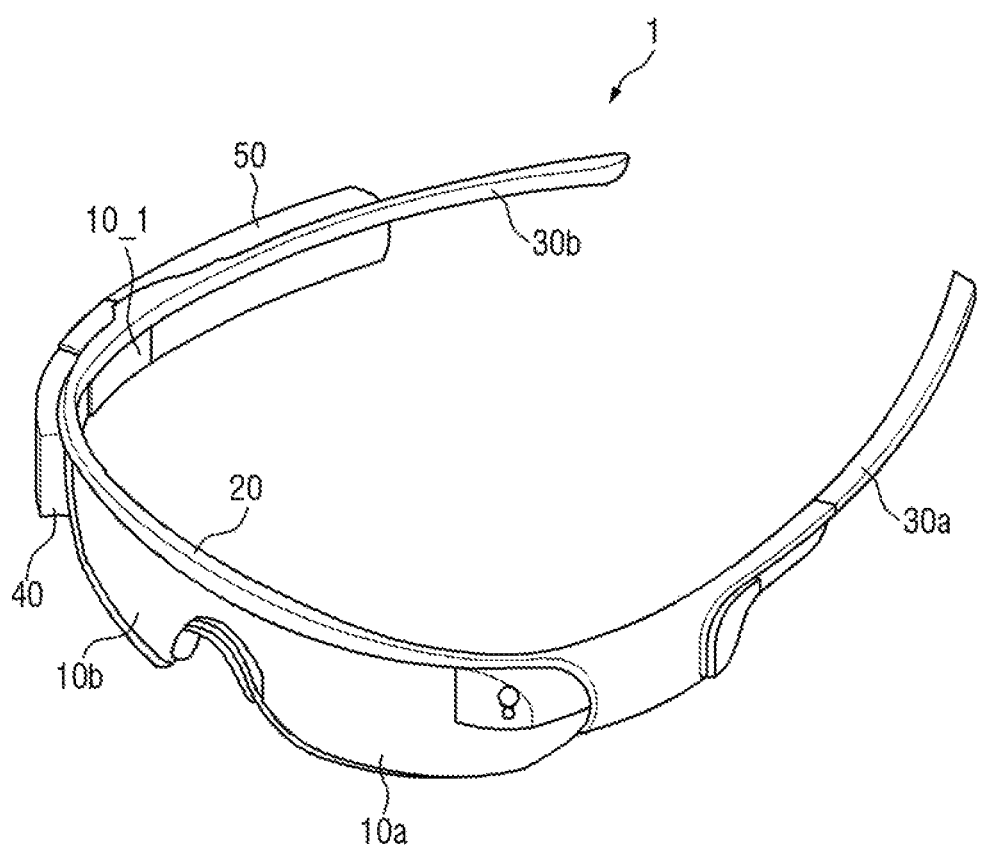
FIG. 19 is an diagram illustrating a glasses-type virtual reality apparatus including a display module according to some embodiments.
Figure 20:
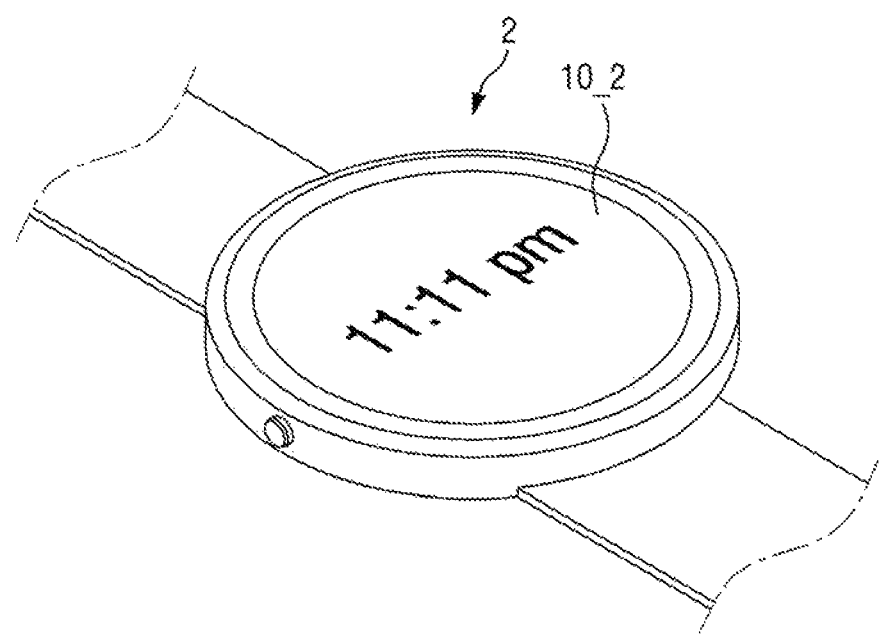
FIG. 20 is an diagram illustrating a watch-type smart device including a display module according to some embodiments.

FIG. 19 is an diagram illustrating a glasses-type virtual reality apparatus including a display module according to some embodiments. Also, FIG. 20 is an diagram illustrating a watch-type smart device including a display module according to some embodiments.

FIG. 19 illustrates a glasses-type virtual reality device 1 including eyeglass frame legs 30a and 30b. The glasses-type virtual reality device 1 according to some embodiments may include a display device 10_1, a left-eye lens 10a, a right-eye lens 10b, a support frame 20, eyeglass frame legs 30a and 30b, a reflective member 40, and a display device accommodating unit 50.

The glasses-type virtual reality device 1 according to some embodiments may be applied to a head-mounted display including a head-mounted band that may be mounted on a head instead of the eyeglass frame legs 30a and 30b. That is, the glasses-type virtual reality device 1 according to some embodiments is not limited to that illustrated in FIG. 19 and may be applied to various electronic devices in various other forms.

The display device accommodating unit 50 may include a reflective member 40 and a display device 10_1 such as a micro LED. An image displayed on the display device 10_1 may be reflected by the reflective member 40, and may be provided to a user's right eye through the right-eye lens 10b. Accordingly, the user may view the virtual reality image displayed on the display device 10 through the right eye.

FIG. 19 illustrates that the display device accommodating unit 50 is located at the right end of the support frame 20, but the embodiments of the present disclosure are not limited thereto. For example, the display device accommodating unit 50 may be located at the left end of the support frame 20. In this case, images displayed on the display device 10_1 may be reflected by the reflective member 40 and provided to a user's left eye through the left-eye lens 10a. Accordingly, the user may view the virtual reality image displayed on the display device 10_1 through the left eye. Alternatively, the display device accommodating unit 50 may be located at the left end and the right end of the support frame 20. In this case, the user may view virtual reality images displayed on the display device 10_1 through the left eye and the right eye.

Also, as shown in FIG. 20, the image display device 110 included in the AR-content-providing apparatus 111 of the present disclosure may be applied to a display device 10_2 of the watch-type smart device 2, which is one smart device.

Figure 21:
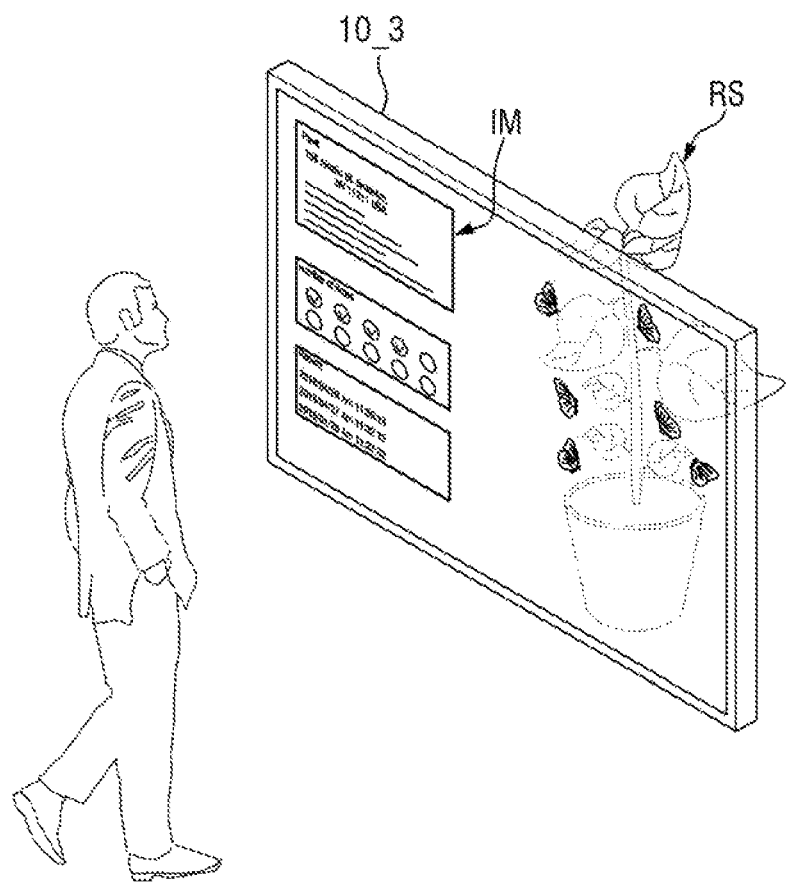
FIG. 21 is an diagram illustrating a transparent display device including a display module according to some embodiments.

FIG. 21 is an diagram illustrating a transparent display device including a display module according to some embodiments.

Referring to FIG. 21, the image display device 110 included in the AR-content-providing apparatus 111 of the present disclosure may be applied to a transparent display device 10_3. The transparent display device may transmit light while displaying an image IM. Therefore, a user who is located in front of the transparent display device might not only view the image displayed on the image display device 110 but also view an object RS or a background located behind the transparent display device. When the image display device 110 is applied to the transparent display device, the display panel 212 of the image display device 110 shown in FIG. 5 may include a light transmitting part capable of transmitting light or may be formed of a material capable of transmitting light.

In concluding the detailed description, those skilled in the art will appreciate that many variations and modifications can be made to the disclosed embodiments without substantially departing from the aspects of the present disclosure. Therefore, the disclosed embodiments are used in a generic and descriptive sense only and not for purposes of limitation.

What is claimed is:

1. An augmented reality (AR)-content-providing apparatus comprising:
   display modules configured to display AR content images on windows of a vehicle;
   at least one sensing module configured to generate image data obtained by capturing surroundings of the vehicle, and configured to generate distance-sensing signals corresponding to distances to objects or people outside the vehicle; and
   a control module configured to generate AR content corresponding to driving information and surrounding information of the vehicle using the image data and the distance-sensing signals, and configured to control the display modules and at least one electronic device to display the AR content, the control module comprising:
a signal-processing unit configured to receive control information of the vehicle through an instrument system of the vehicle, and configured to generate directionality information, location information, or distance information of the objects or the people outside the vehicle;
a content generation control unit configured to classify at least one of the control information, the driving information, the directionality information, the location information, or the distance information according to an image display position of the display modules, and configured to generate AR content data for the display modules; and
a display control unit configured to modulate the AR content data classified for the display modules according to the image display position of the display modules, and configured to control the display modules.

2. The AR-content-providing apparatus of claim 1, wherein the control module is further configured to:
receive the control information through the instrument system of the vehicle;
generate at least one of guidance information, the directionality information, the location information, or caution information according to the driving information, the control information, or the surrounding information of the vehicle; and
generate the AR content data for the display modules by classifying at least one of the driving information, the control information, the surrounding information, the guidance information, the directionality information, the location information, or the caution information according to an AR content image display position of the display modules.

3. The AR-content-providing apparatus of claim 1, wherein the display modules comprise:
a first display module configured to provide the AR content image to a first image display area in one of the windows in front of a driver seat;
a second display module configured to provide the AR content image to a second image display area in one of the windows at a side of the driver seat;
a third display module configured to provide the AR content image to a third image display area in one of the windows on a rear side of the vehicle;
a fourth display module configured to provide the AR content image to a fourth image display area of one of the windows at a side of a passenger seat;
a fifth display module configured to provide the AR content image to a fifth image display area in a sunroof or a reflective member in a ceiling of the vehicle; and
a sixth display module configured to provide the AR content image to a sixth image display area of a center fascia, a dashboard, or a console box inside the vehicle.

4. The AR-content-providing apparatus of claim 3, wherein the content generation control unit is configured to control the display control unit such that:
a first AR content image comprising at least one of the control information, the driving information, the directionality information, the location information, or the distance information is displayed by the first display module;
a second AR content image comprising the control information, the driving information, the directionality information, the location information, or guidance information or caution information corresponding to the distance information is displayed by the second display module;
a third AR content image comprising the guidance information or the caution information is displayed by the third display module;
a fourth AR content image comprising the directionality information, the distance information, or the guidance information is displayed by the fourth display module;
a fifth AR content image comprising the driving information, the guidance information, or the caution information is displayed by the fifth display module; and
a sixth AR content image comprising the driving information, the guidance information, or the caution information is displayed by the sixth display module.

5. The AR-content-providing apparatus of claim 3, wherein the first to sixth display modules, the at least one sensing module, and the control module are integrally formed or assembled with at least one of a room mirror, the center fascia, the dashboard, the console box, a dome light, a sun visor, a sunroof control box, or a headrest.

6. The AR-content-providing apparatus of claim 1, wherein the control module further comprises an electronic device control unit configured to operate at least one acoustic device, vibration device, or fragrance device of the at least one electronic device according to characteristics of the AR content data.

7. The AR-content-providing apparatus of claim 1, wherein the content generation control unit is configured to receive biosignal information comprising at least one of heart rate information, blood pressure information, or body temperature information from one or more external content display devices, is configured to generate the AR content data comprising the biosignal information, and is configured to transmit, to the display control unit, the AR content data comprising the biosignal information to be displayed on at least one of the display modules.

8. The AR-content-providing apparatus of claim 7, wherein the external content display devices comprise at least one of a flat-panel content display device, a glasses-type virtual reality device, or a watch-type smart device to display the AR content data shared with the control module through an AR content image, vibration, or sound effect.

9. The AR-content-providing apparatus of claim 1, wherein the display modules comprises:
at least one image display device configured to display the AR content image; and
at least one diffusion lens, at least one focusing lens, and at least one optical member for changing a display path of the AR content image and an optical wavelength.

10. The AR-content-providing apparatus of claim 9, wherein the at least one image display device comprises:
a partition wall on a substrate;
light-emitting devices arranged in light-emitting areas arranged in an RGBG matrix structure by partition of the partition wall, and extending in a thickness direction of the substrate;
a base resin in the light-emitting areas; and
an optical pattern in at least one of the light-emitting areas.

11. The AR-content-providing apparatus of claim 10, wherein the light-emitting areas comprise a first light-emitting area, a second light-emitting area, and a third light-emitting area, or the first light-emitting area, the second light-emitting area, the third light-emitting area, and a fourth light-emitting area, in a pixel area in the RGBG matrix structure.

12. The AR-content-providing apparatus of claim 11, wherein the first light-emitting area comprises:
- a first light-emitting device configured to emit first light in a wavelength band corresponding to any one of red, green, or blue;
- a second light-emitting device configured to emit second light in a wavelength band corresponding to another one of red, green, or blue, which is different from that of the first light;
- a third light-emitting device configured to emit third light in a wavelength band corresponding to yet another one of red, green, or blue, which is different from those of the first light and the second light; and
- a fourth light-emitting device configured to emit fourth light in a same wavelength band as one of the first light, the second light, or the third light.

13. The AR-content-providing apparatus of claim 11, wherein the first to fourth light-emitting areas have a same size or planar area, and
- wherein a distance between the first light-emitting area and the second light-emitting area, which are adjacent to each other in a transverse direction or a diagonal direction, a distance between the second light-emitting area and the third light-emitting area, which are adjacent to each other in the transverse direction or the diagonal direction, a distance between the first light-emitting area and the third light-emitting area, which are adjacent to each other in the transverse direction or the diagonal direction, and a distance between the third light-emitting area and the fourth light-emitting area, which are adjacent to each other in the transverse direction or diagonal direction, are the same.

14. The AR-content-providing apparatus of claim 11, wherein two or more of the first light-emitting area, the second light-emitting area, the third light-emitting area, and the fourth light-emitting area have different respective sizes or planar areas, and
- wherein two or more of a distance between the first light-emitting area and the second light-emitting area, a distance between the second light-emitting area and the third light-emitting area, a distance between the first light-emitting area and the third light-emitting area, and a distance between the third light-emitting area and the fourth light-emitting area are different.

15. An augmented reality (AR)-content-providing method comprising:
- generating image data obtained by capturing surroundings of a vehicle and distance-sensing signals corresponding to distances to objects or people outside the vehicle;
- generating AR content comprising driving information and surrounding information of the vehicle using the image data and the distance-sensing signals;
- controlling display modules and at least one electronic device to display the AR content;
- displaying AR content images on windows of the vehicle through the display modules;
- receiving control information of the vehicle through an instrument system of the vehicle;
- generating directionality information, location information, or distance information of the objects or the people outside the vehicle;
- classifying at least one of the control information, the driving information, the directionality information, the location information, or the distance information according to an image display position of the display modules; and
- modulating AR content data classified for the display modules according to the image display position of the display modules.

16. The AR-content-providing method of claim 15, wherein the generating AR content comprises:
- detecting the surrounding information the driving information and the distance information through the image data and the distance-sensing signals; and
- generating the AR content data for the display modules by classifying the driving information, the control information, and the surrounding information according to an AR content image display position for the display modules.

17. The AR-content-providing method of claim 16, wherein the generating AR content data for the display modules comprises:
- generating at least one of guidance information, the directionality information of the objects, the location information, or caution information according to the driving information, the control information, or the surrounding information;
- classifying at least one of the driving information, the control information, the surrounding information, the guidance information, the directionality information, the location information, or the caution information according to the image display position for first to sixth display modules comprised in the display modules; and
- modulating the AR content data classified for the first to sixth display modules according to display characteristics for the first to sixth display modules.

18. The AR-content-providing method of claim 17, wherein the controlling display modules and the at least one electronic device comprises operating at least one acoustic device, vibration device, or fragrance device in response to characteristics of the AR content data classified for the first to sixth display modules.

19. The AR-content-providing method of claim 17, wherein the generating the AR content data for the display modules further comprises:
- generating a detection signal for a driver's eye or pupil through at least one sensing module;
- generating the AR content data comprising driver condition information corresponding to the detection signal;
- setting the AR content data comprising the driver condition information to be displayed on at least one of the first to sixth display modules; and
- providing the AR content data to a display control unit for controlling the first to sixth display modules.

20. An electronic device including an augmented reality (AR)-content-providing apparatus, the augmented reality (AR)-content-providing apparatus comprising:
- display modules configured to display AR content images on windows of a vehicle;
- at least one sensing module configured to generate image data obtained by capturing surroundings of the vehicle, and configured to generate distance-sensing signals corresponding to distances to objects or people outside the vehicle; and
- a control module configured to generate AR content corresponding to driving information and surrounding information of the vehicle using the image data and the distance-sensing signals, and configured to control the display modules and at least one electronic device to display the AR content, the control module comprising:
  - a signal-processing unit configured to receive control information of the vehicle through an instrument system of the vehicle, and configured to generate directionality information, location information, or distance information of the objects or the people outside the vehicle;

a content generation control unit configured to classify at least one of the control information, the driving information, the directionality information, the location information, or the distance information according to an image display position of the display modules, and configured to generate AR content data for the display modules; and a display control unit configured to modulate the AR content data classified for the display modules according to the image display position of the display modules, and configured to control the display modules.

* * * * *